United States Patent [19]
Clement et al.

[11] 4,113,986
[45] Sep. 12, 1978

[54] TELEPHONE CONTROLLED LOCK RELEASE ARRANGEMENT

[75] Inventors: George Frederick Clement, Naperville, Ill.; Bruno Raymond Sniegowski, Westerville, Ohio

[73] Assignees: Bell Telephone Laboratories, Incorporated, Murray Hill, N.J.; Western Electric Company, New York, N.Y.

[21] Appl. No.: 844,377

[22] Filed: Oct. 21, 1977

[51] Int. Cl.² ............................................ H04M 11/00
[52] U.S. Cl. ..................................... 179/2 A; 179/39; 179/1 H
[58] Field of Search ................... 179/1 H, 2 A, 2 TV, 179/37, 39, 41 A, 41 R

[56] References Cited

U.S. PATENT DOCUMENTS

| | | | |
|---|---|---|---|
| 2,377,850 | 6/1945 | Blakeslee | 179/2 A |
| 3,342,944 | 9/1967 | Barbato et al. | 179/1 H |
| 3,406,260 | 10/1968 | McEowen | 179/37 |
| 3,428,753 | 2/1969 | Pfleiderer et al. | 179/41 A |
| 3,484,561 | 12/1969 | Matthews | 179/39 |
| 3,557,318 | 1/1971 | Buonsante et al. | 179/39 |
| 3,917,911 | 11/1975 | Lesher | 179/37 |
| 3,947,641 | 3/1976 | Trell | 179/2 A |

FOREIGN PATENT DOCUMENTS

211,308  9/1956  Australia ........................ 179/41 A

*Primary Examiner*—Kathleen H. Claffy
*Assistant Examiner*—Kenneth A. Chayt
*Attorney, Agent, or Firm*—Frederick W. Padden

[57] ABSTRACT

Circuitry is disclosed for the automatic dial-up of an apartment telephone from a lobby telephone to provide voice communication therebetween via a central switching office and for controlling the establishment of a switched signaling path through a switching network independent of the central office and then the unlocking of the lobby door over that switched path. The circuitry includes a trunk circuit for connecting the lobby telephone set to the central office and service circuits for detecting and processing call on/off-hook and ring signals as well as lobby door lock release signals from the called apartment. Distinctive tone bursts are applied by a service circuit through the switched path to notify the called apartment dweller of a lobby originated call.

40 Claims, 11 Drawing Figures

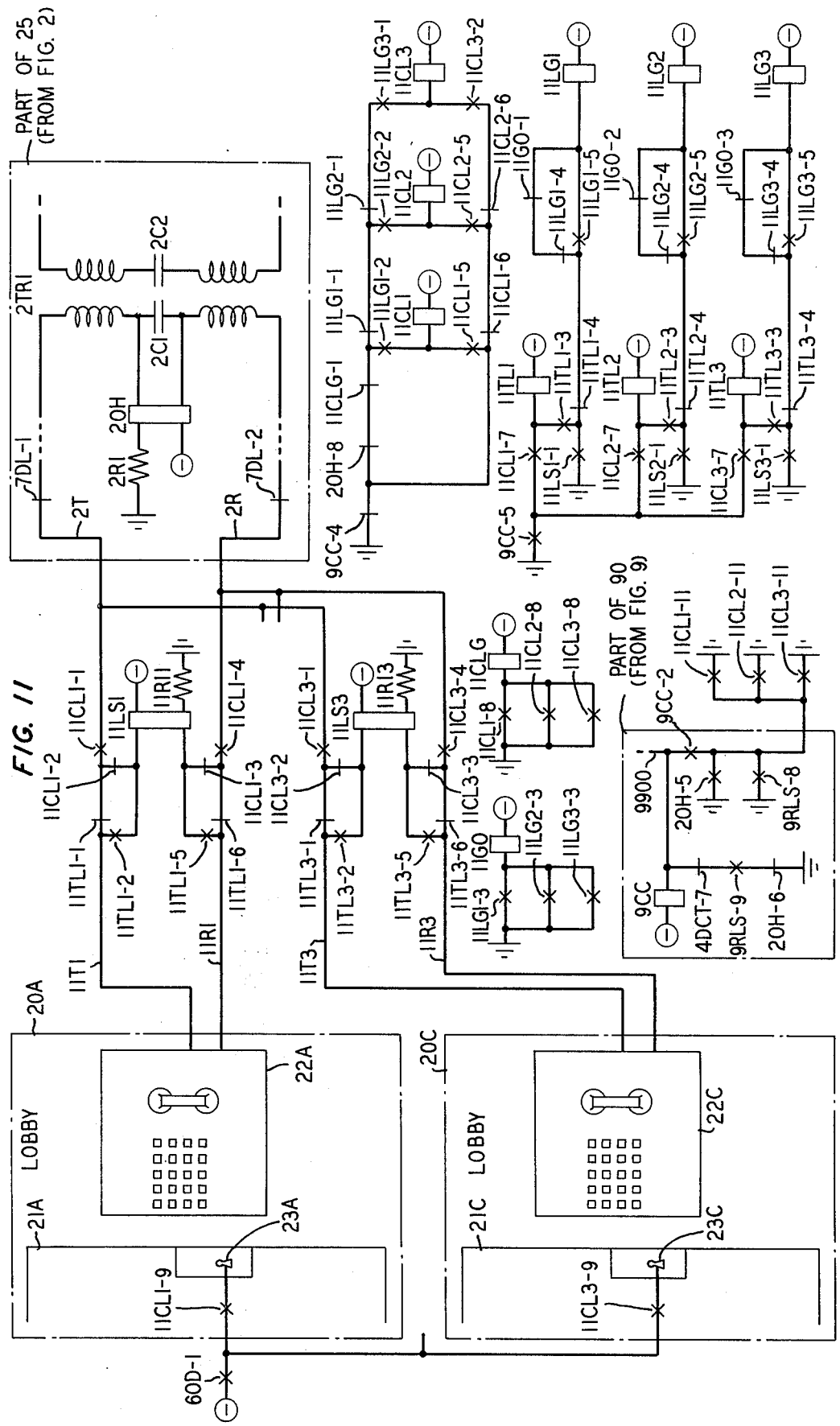

TELEPHONE CONTROLLED LOCK RELEASE ARRANGEMENT

BACKGROUND OF THE INVENTION

This invention relates to lock release systems and in particular to a common control circuit arrangement suitable for use with a telephone system to establish voice communication and lobby door lock release connections from a lobby phone to any one of a plurality of apartment phones. The arrangement includes a trunk circuit, switching network and service circuits for establishing switched voice communication paths via a central office between the lobby and apartment phones and a separate switched signaling path, independent of the central office, between a lobby door lock and the apartment phones, for effecting a lobby door unlocking.

Lock release systems are frequently employed in door answering arrangements wherein a visitor or serviceman in the lobby, vestibule, or other lock controlled access point of a building or premises, seeks to be admitted to the interior thereof. The visitor employs a master station set near the locked access point to communicate his entry request to a selected one of many authorizing station sets usually located in the building or on the premises. Persons positioned at the authorizing station sets such as residents, tenants, executives, security guards, or other authorizing personnel who wish to admit the visitor can transmit a signal from their station set to effect release of the door lock.

A multitude of arrangements are presently available for lobby-apartment communication to effect lock release. For example, intercom arrangements are available which employ special purpose receiver/transmitter intercoms in the lobby and apartments and elaborate individual interconnective wiring therebetween. Although effective in selectively establishing lobby-apartment communication, intercom arrangements have the disadvantage of being difficult to maintain and of requiring specialized intercom units and unwieldy wiring interconnections, resulting in prohibitive expense particularly where the intercom system is newly installed in existing buildings.

Other apartment door answering arrangements employed in the prior art utilize special relay switching facilities, dedicated common control equipment and hold bridge circuits either at the apartment building or at a telephone central office to establish a switched voice path connection between conventional telephone sets in the lobby and the apartments. To admit the visitor, the apartment dweller generates a signal, often by dialing or keying out a predetermined digit, over the switched voice path connection. However, these arrangements, while incorporating conventional telephone sets and portions of telephone lines, do not make use at all of the conventional telephone switching network and central office common control equipment.

Recent arrangements have provided for the establishment of the lobby-apartment connection entirely over conventional telephone facilities including the central office switching network and common control circuitry. In such arrangements, a prestored directory telephone number of a selected apartment is automatically dialed from a lobby phone for establishing a conventional switched voice path connection through the central office to request entry. Door lock release signals are then generated at the apartment telephone set and are routed over this switched voice path.

These recent arrangements, although effectively utilizing substantially all of existing telephone equipment and facilities, give rise to several problems. One such problem involves lock release signal distortion when that signal is a D.C. dial pulse digit transmitted from the apartment telephone over the voice path and switched through the central office. The distortion problem is particularly accentuated when the voice path connection must be switched via a tandem trunk or tandem switching office to connect two distinct central offices respectively serving the lobby and apartment telephone sets. This distortion problem necessitates the use of sensitive, complex and costly signal detection and processing circuits near the lock mechanism to distinguish distorted dial pulse lock release signals from background transmission noise. Another problem concerning these recent arrangements involves limitations on the provision of a special "call alerting" feature wherein, by the application of audible tone bursts onto the voice path, the apartment dweller is notified that a call is lobby-originated. This feature can be provided readily and inexpensively only when the central office is stored program controlled and has the feature resident in processor memory but not in non-stored program controlled central offices where inclusion of the feature would require substantial cost and cumbersome hardware changes in central office equipment.

In view of the foregoing, it is apparent that a need exists for lock release systems which effectively utilize substantially all of the telephone equipment employed in the establishment of regular telephone voice path connections and which, at the same time, eliminate operational faults in the lock release control mechanism due to distortion of signals transmitted from the apartment telephone over those voice path connections. A specific need therefore exists for an arrangement that prevents annoyance and confusion due to the non-release of the lock mechanism when a dial pulse digit is transmitted with distortion from an apartment telephone set through the central office to the lock release mechanism. A need also exists to provide equipment that notifies the apartment dweller of the visitor's presence via, e.g., a call alerting tone, without resorting to cumbersome and costly modifications of the common control equipment in a switching office.

SUMMARY OF THE INVENTION

The foregoing and other problems are solved and needs are fulfilled in accordance with our invention in two specific illustrative embodiments thereof. In the first illustrative embodiment, common control circuitry for providing door lock release service is shared by conventional apartment and lobby telephone sets. The control circuitry establishes a switched voice path connection via a conventional central office and a separate switched signaling path, independent of the central office, for controlling the opening of a lobby door. The establishment of the separate signaling path advantageously prevents visitor and apartment dweller annoyance and confusion due to lock release signaling failures by eliminating the distortion of dial pulse lock release signals that had arisen in the prior art when these signals were transmitted over conventional voice paths via a central office. Our provision of a separate signaling path and tone facilities also advantageously supplies a call alerting tone to an apartment telephone line without requiring any modification of the common control equipment at the central office. Advantageously, our lock release control circuitry is connectable to a central terminal block location in the basement or utility room of the apartment building for convenient interconnection with the lobby and apartment telephone lines and requires only two wired connections to the lobby for connection to the door lock mechanism and to the lobby telephone set.

The common control circuitry includes a multiline trunk circuit having a first termination connected to a lobby telephone and a second termination connected to a conventional telephone central office for furnishing the voice communication path from the lobby phone to any apartment telephone on a dial-up basis. Advantageously, an illustrative third termination of the trunk circuit is multiple connected to a crosspoint switching network and to a variety of service circuits which process dial, call supervision and coded lock release signals.

Our crosspoint switching network furnishes the switched signaling path among a called apartment phone and the trunk and service circuits. Significantly, the signaling path is separate and independent of communication through the central office and is set up as a result of coded signals or digits outpulsed from the lobby phone. Advantageously, it furnishes a reliable medium for initially sending signals to a called apartment phone to indicate an incoming call from the lobby and for subsequently transmitting lobby door lock release control signals from the apartment phone to our service circuits to effect a lobby door unlocking.

In the first illustrative embodiment, the lobby station set is a repertoire dialer set which, in accordance with conventional operation, allows for one of a plurality of prerecorded seven-digit telephone directory numbers to be dialed automatically from that set by the depressing of a single pushbutton corresponding to the desired apartment phone. In accordance with an illustrative aspect of our invention, two prefix digits, in addition to the seven-digit directory telephone number, are prerecorded for each apartment and are outpulsed when the corresponding pushbutton is depressed. The two prefix digits are received successively at our trunk circuit, multifrequency digit receiver, and switching network control circuit to operate a particular select magnet and a particular hold magnet in our crosspoint switching network. Our state counter, coupled to the digit receiver, counts the number of digit durations and interdigital periods that have elapsed. During receipt of the prefix digits, the transmission path between the trunk circuit and the central office is split until our state counter circuit indicates to a trunk circuit control circuit that outpulsing of the prefix digits is complete. Thereupon, the lobby set-central office connection is cut through. The remaining seven directory number digits, while still being received to update our state counter, are also transmitted for regular call processing to the central office.

Our service circuits include a line state detector for detecting the state of a called apartment phone. The detector monitors the selected apartment line for its on-hook/off-hook state and for the appearance thereon of a ringing signal. Delay circuits are provided to insure that the detected changes of state persist for a predetermined duration whose length is variably determined in accordance with the state of the call.

Another service circuit includes a tone generator which illustratively, when actuated, generates periodic bursts of tone over the switched signaling path to alert the apartment dweller of the lobby visitor's attempt to communicate with him. Alerting tone is illustratively applied via a control circuit in two call establishment states or situations. The first such state occurs while the directory telephone number of the selected apartment set is being outpulsed and the line of that apartment set is sensed by the line state detector as off-hook indicating that the apartment dweller's telephone is busy. In such case alerting tone is applied, busy tone is returned in the conventional fashion from the central office to the lobby set and the call is then released. In the second alerting tone situation, tone bursts are applied after all directory number digits have been outpulsed and the line state detector senses an off-hook signal on the called apartment line indicating that the call has been answered by the apartment dweller. The applied tone notifies the apartment dweller that he is answering a lobby-originated call.

After the alerting tone has been applied, the lobby-to-apartment switched voice path connection is established via the trunk circuit and through the central office in the conventional manner. The apartment dweller can then on the basis of the conversation with the visitor decide whether to admit him. To admit the visitor, the apartment dweller generates coded signals, preferably comprised of a predetermined digit, or digits from his telephone set to serve as a lock release signal. The generated digit(s) appears as a series of alternating on-hook and off-hook voltages that constitute dial pulses if the apartment set is rotary-dial equipped and as multifrequency tones if the apartment set is pushbutton-equipped.

A logic circuit is employed to control the opening of the lobby door by recognizing door-opening digits. The logic circuit receives such digits by advantageously being connected both to the line state detector for the detection of on-hook and off-hook dial pulse voltages and to the same multifrequency digit receiver previously employed in the detection of the nine digits outpulsed from the lobby set for the detection of a multifrequency door-opening digit.

In accordance with a novel aspect of our invention, a prescribed dial pulse digit number generated from the apartment set is advantageously routed with minimal distortion as a series of on- and off-hook voltages through the closed crosspoints of our switching network for detection at the line state detector. Dial pulses so detected are counted in the door open logic circuit to insure that a valid prescribed digit(s) has been dialed. The logic circuit also delays acknowledgement of the receipt of the prescribed digit for a predetermined interval to insure that a digit of higher value than the prescribed one does not effect an opening of the door-lock mechanism. Circuitry is also provided for temporarily splitting the lobby set-trunk circuit transmission path during this delay interval to prevent the visitor from simulating the generation of a door-opening digit to gain unauthorized entry to the apartment building.

If, on the other hand, a multifrequency tone digit number is generated from the apartment phone, the digit is routed via the crosspoint switch and through the trunk circuit for detection at the multifrequency digit receiver. As is the case with recognition of dial pulses, recognition of the predetermined multifrequency digit is delayed for a predetermined interval while the lobby set-trunk circuit path is temporarily opened after an initial receipt of that digit to prevent multifrequency tone simulation by the visitor in the lobby. The validity of the received multifrequency digit is established when it has persisted for the predetermined interval and the lobby set has been temporarily cut off from the voice path connection. When the door-opening digit is finally recognized, a lock mechanism control circuit is actuated to effect lock release for a timed interval.

Our lock release control circuitry further includes a call disconnect circuit that resets the control, delay and logic circuits of our circuitry, a master timing circuit for providing to the various control delay and logic circuits a plurality of digital pulse trains of different repetition rates and a reset logic circuit, connected to the outputs of the various control, delay and logic circuits and the state counter, for recycling the master timing circuit and/or for actuating the call disconnect circuit in accordance with the state of the lobby-apartment call.

In the second illustrative embodiment, preference circuitry is provided, in addition to our lock release control circuitry, for queueing competing requests for service of our circuitry from various lobbies or entry points to the apartment building. The queueing circuit operates to lock out other lobby sets from connection to the trunk circuit when a given lobby set is already connected thereto. Circuitry is also included in this illustrative embodiment for preventing a situation wherein the trunk circuit remains connected to a lobby set in which the receiver thereof has been left dangling off hook.

Thus, in accordance with an aspect of our invention a call between an entry-requesting phone near a locked access point of a building or premises and an entry-authorizing phone located at the interior of that building is established to achieve lock release by utilizing substantially all of the regular telephone equipment including the central office switch, while operational faults in the lock release control mechanism due to distortion of the lock release signals sent over regular telephone central office equipment are minimized. Moreover, annoyance and confusion of both parties due to the continued busy condition of the authorizing phone engaged in an outside telephone call or due to the non-release or unintended release of the lock release mechanism are reduced.

DESCRIPTION OF THE DRAWING

The foregoing and other aspects of our invention are more fully understood by a reading of the ensuing description with reference to the drawing in which:

FIG. 11 shows, in accordance with another specific illustrative embodiment of our invention, a circuit for queueing service requests for lock release control in a building having a plurality of lobbies.

Figure 1:
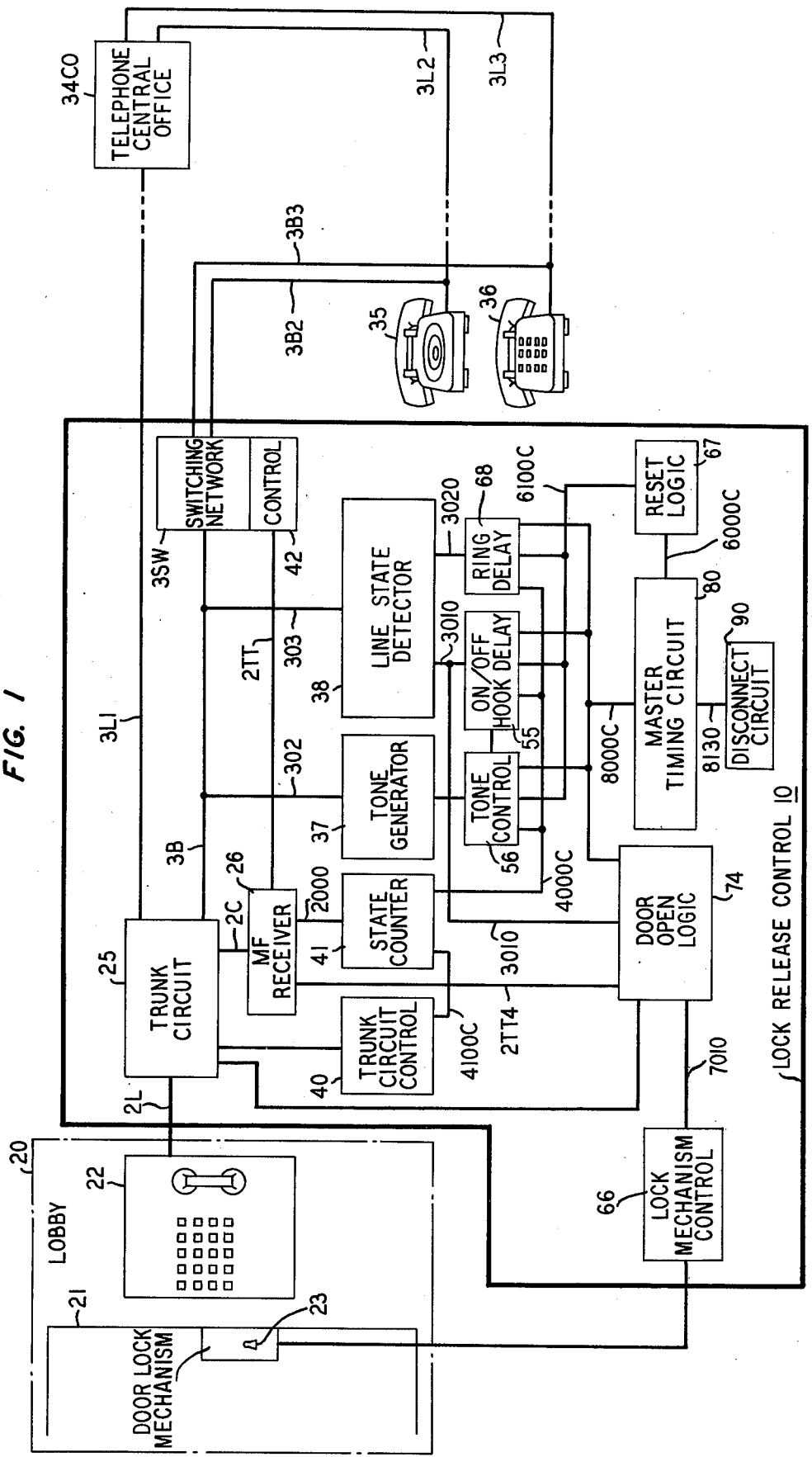
FIG. 1, in block diagram form, depicts our lock release control circuitry, shown in heavy line block, connected between a lobby telephone set, a telephone central office and several apartment telephone sets in accordance with one specific illustrative embodiment of our invention.

It is noted that FIGS. 2-9 and 11 employ the "detached" contact schematic notification in which an "x" crossing the line represents a normally opened contact of a relay and a bar crossing the line represents a normally closed contact of a relay. This type of notation is described in an article entitled "An Improved Dedicated Contact Type Schematic Circuit Drawing" by F. T. Meyer in the September 1955 issue of the American Institute of the Electrical Engineers, *IEEE Transactions, Communications and Electronics*, Vol. 74, pages 505-13.

Each relay and magnet contact is uniquely designated in the drawing in a manner indicative of the relay of which it is a part. For example, referring to relay contact 20H-5 in FIG. 9, it is noted that the "2" portion of the designation indicates that the winding of the relay appears on FIG. 2, that the "OH" portion of the designation indicates that the contact is controlled by relay 20H of FIG. 2 and that the "−5" portion uniquely identifies that particular contact of the 20H relay. A suffix digit in parenthesis, such as "(9)" is added in the following description to a designation such as the foregoing 20H-5 to form 20H-5(9) to indicate that relay contact 20H-5 is to be found on FIG. 9 of the drawing.

GENERAL DESCRIPTION

In FIG. 1, the equipment units illustrative of the principles of our invention include lock release control circuitry 10, shown in heavy lined block, which connects lobby telephone 22 to a central office 34CO and illustrative apartment phones 35 and 36. Other equipment units are neither shown nor described in detail herein except where necessary for complete understanding of the invention.

Lobby phone 22 is illustratively of the electronic repertory dialer type having an array of buttons for direct selection of a called phone as disclosed in A. A. Bukosky et al., U.S. Pat. No. 3,670,111, issued June 13, 1972 wherein each of a predetermined set of seven-digit directory numbers, illustratively corresponding to apartment telephone numbers, is initially recorded in an assigned, erasable memory unit in the repertoire set, illustratively in the apartment lobby. A caller can then select any such number for automatic dialing by depressing the one of the array of selector buttons that corresponds to the selected number. A conventional set of pushbuttons is also provided to enable the caller to key out a directory number, manually, in the conventional fashion. In the exemplary embodiment, however, several modifications to the repertoire set disclosed in the Bukosky et al. patent are incorporated.

First, in order to enable establishment of a switched connection between service circuits of our lock release control circuitry 10 and the selected apartment telephone line, as will be detailed below, nine digits rather than the conventional seven are stored for automatic dialout in each memory unit of lobby set 22. The first two of these nine digits are utilized to establish the switched connection between the service circuits connected to cable 3B, including tone generator 37 and line state detector 38, and a selected apartment line and phone such as, line 3B2 and phone 35 or line 3B3 and phone 36. The remaining seven digits are employed to establish a regular telephone connection from trunk circuit 25 over line 3L1, through central office 34CO and over a connecting line to a called apartment phone.

It is desirable to disable the pushbutton panel of the Bukosky set which is used for manual dialout of multi-frequency pulses in lobby set 22 to prevent it from being used to communicate with regular telephone subscribers not located in the apartment building.

Figure 3:
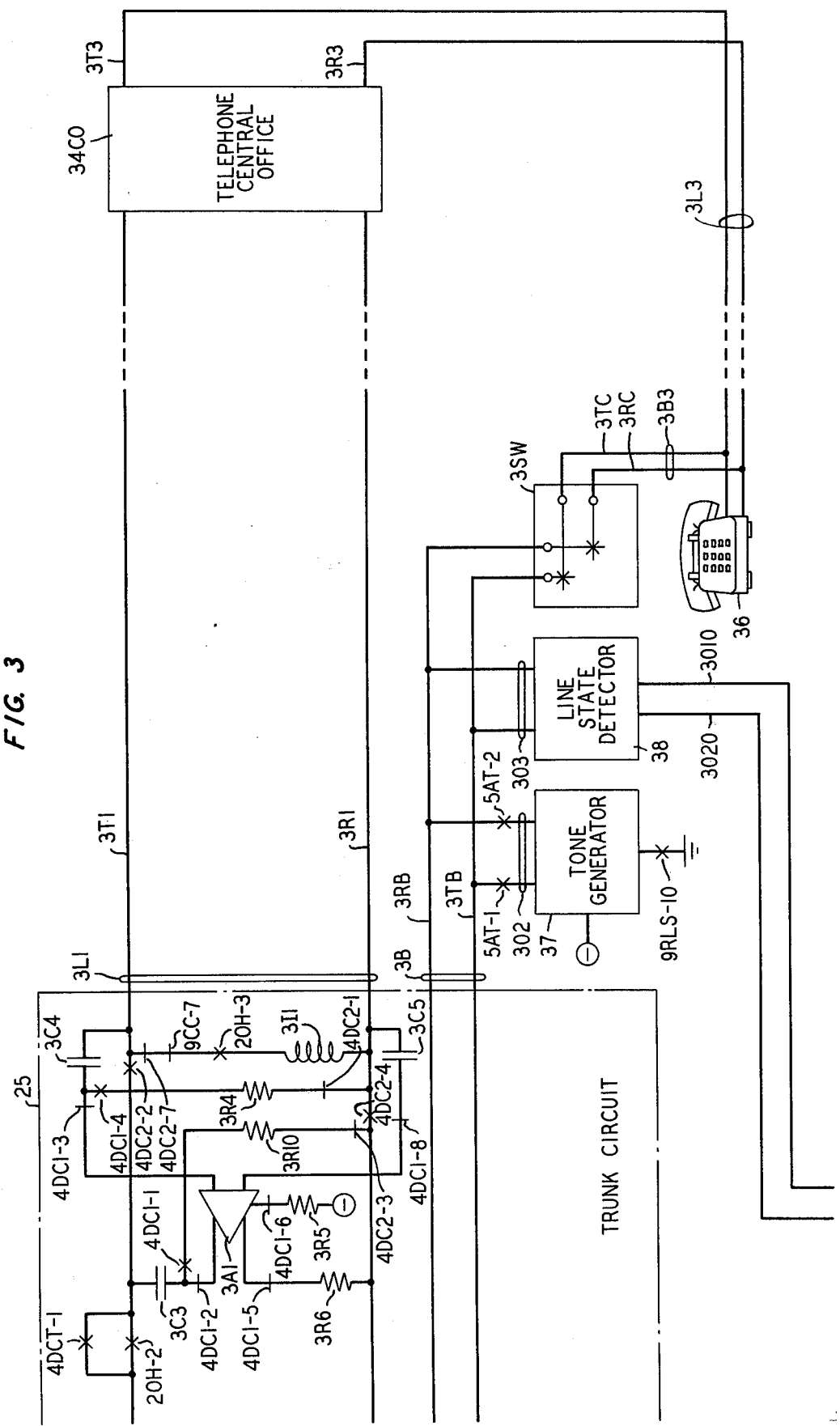
FIG. 3 shows the remaining schematic portion of the trunk circuit, service circuits for both the detection and the generation of signals on the line of an apartment telephone set and a crosspoint switch.

Apartment lobby 20 of FIG. 1 includes a door 21 and door lock mechanism 23 which illustratively is an electronic, relay-operated door lock circuit that includes a conventional microswitch as shown in FIG. 3 of J. J. Buonsante, U.S. Pat. No. 3,557,318, issued Jan. 19, 1971.

The establishment of the switched connections between the lobby and apartment telephones is initiated when the visitor causes lobby set 22 to go off-hook and thereby, via line 2L, changes the supervisory state of trunk circuit 25 from idle to off-hook. Changes of supervisory state are transmitted over line 3L1 to central office 34CO which operates in the conventional manner to return dial tone to set 22. Trunk circuit 25 includes facilities which prior to apartment selection by the visitor allow passage of the transmitted dial tone to the caller but which does not permit any signals to be sent in the reverse direction.

Upon hearing dial tone, the visitor depresses one of the selector buttons of set 22 to initiate the establishment of a conventional telephone connection to one of the apartment sets. These sets illustratively may be rotary dial-operated as depicted by apartment set 35 or pushbutton-operated as indicated by set 36. For the purpose of ensuing discussion set 36 is assumed to be the selected one.

Depressing the apartment selector key activates the automatic dialout circuitry in lobby set 22 automatically to key out from its memory unit nine multifrequency digits corresponding to set 36. The first two of these nine digits to arrive at trunk circuit 25 are not transmitted over line 3L1 to central office 34CO but are sent only over cable 2C to multifrequency receiver 26. They are sent via cable 2TT to a switching network control circuit 42 for operating a particular select magnet and a specific hold magnet in switching network 3SW. A unique switched connection path is thereby established between set 36 and various service circuits including tone generator 37, line state detector 38 and other cooperating control and delay circuits.

Digits received at receiver 26 are also utilized to control the signal transmission path across trunk circuit 25 between set 22 and office 34CO. Lead 2000 of receiver 26 changes state upon completion of the duration of each of the nine transmitted digits and upon completion of each interdigital period. Each of these state changes delivers a triggering signal to state counter 41 which tracks the number of digits and interdigital times that have elapsed at any point during call establishment. Each digit that arrives at trunk circuit 25 is routed via cable 2C to receiver 26 thereby enabling lead 2000 until the next interdigital period begins. Upon completion of the first interdigital period, counter 41 generates a signal over cable 4100C which operates a relay in trunk circuit control circuit 40 to open the closed transmission path across trunk circuit 25 which had initially carried dial tone to lobby set 22. Completion of the second interdigital period causes counter 41 to generate a signal via cable 4100C that operates another relay in control circuit 40 which results in the cutting through, in both directions, of the split transmission path across trunk circuit 25. Transmission to office 34CO of the subsequent seven digits that correspond to the directory number of selected set 36 is thereby effected. The seven digits are also received at receiver 26 to update counter 41.

It will be observed that after the crosspoints in network 3SW have been closed, one of the service circuits, line state detector 38, is connected over cable 303, via those crosspoints and cable 3B3, to line 3L3 of set 36. Detector 38 is a conventional voltage level detector and is employed to monitor the state of line 3L3 even before all seven directory number digits have been outpulsed. A change of voltage levels on line 3L3, indicative of busy/idle status change in set 36, is detected by an on-/off-hook detector circuit (not shown), included in line state detector 38, and produces a high, logic one output on lead 3010 when set 36 is off hook. On the other hand, detection of a ringing signal voltage level operates a ringing signal detector circuit (not shown), also included in state detector 38, to produce a high output on lead 3020 thereby signifying that set 36 is being rung on another call.

Another service circuit, tone generator 37, is selectively connected to network 3SW via cables 3B and 302. Generator 37 supplies set 36 with periodic bursts of a distinctive tone to alert him that a lobby visitor is attempting to complete a call to his set. Illustratively, this alerting tone is provided in two distinct situations. The first arises when set 36 is in use and in the off-hook state while its directory number is being keyed out of set 22. Upon hearing the tone, the apartment dweller can either ignore it and continue to maintain set 36 in the off-hook state or he can replace its receiver and await a reattempt by the lobby visitor. If the off-hook persists after the office 34CO has processed the dialed directory number, office 34CO returns busy tone via line 3L1, through trunk circuit 25 and line 2L to set 22.

To further elaborate, if set 36 is busy while its directory number is still being outpulsed to office 34CO, state counter 41 presents a logic high signal on cable 4000C to tone control circuit 56 and delay circuits 55 and 68. During this period line state detector 38, senses the off-Hook voltage of set 36 and switches lead 3010 high causing delay circuit 55 to initiate a brief delay interval. Timed signals used in the generation of this delay interval are derived in master timing circuit 80 and are sent to on/off-hook delay circuit 55 via cable 8000C. Upon completion of the delay interval, on/off-hook delay circuit 55 presents a logic high signal over cable 6100C to indicate that set 36 is busy on another call. The signal operates tone control circuit 56 for effecting an application of a tone by generator 37 to apartment set 36 over cable 302 and 3B, and the switched signaling path of network 3SW.

The second situation in which alerting tone is provided to the called apartment set occurs when that set is idle and the call from the lobby is to be successfully completed. Upon answer of that call, tone bursts are provided via network 3SW for notifying the apartment dweller of the lobby-originated call.

To elaborate, if set 36 is idle after the outpulsing of the complete directory number, a high signal is presented by state counter 41 on cable 4000C to control circuit 56 and delay circuits 55 and 68. If coincidentally, line state 38 senses that the apartment dweller has answered, lead 3010 is enabled to operate delay circuit 55 which thereupon initiates a brief delay interval under control of a timing signal on cable 8000C from master timing circuit 80. Upon expiration of the delay interval, tone bursts are supplied to the called set 36 from generator 37 via the switched signaling path including network 3SW and lines 3B, 3B2 and 302.

Assuming that the call has been answered at set 36, conversation with the visitor can proceed. If the visitor is to be admitted, a multifrequency digit must be keyed from the pushbutton pad on set 36 to effect an opening of lobby door 21. In our illustrative embodiment, in order to afford greater apartment building security, only the keying out of the digit four and no other digit will effect the opening of the lobby door. The multifrequency digit so keyed out is not sent over line 3L3 and via central office 34CO to set 22 but is sent distortion-free via the switchboard signaling path comprising cable 3B3, network 3SW, cable 3B, trunk circuit 25, and cable 2C to receiver 26. Upon recognition of the digit four, receiver 26 generates a logic high signal on lead 2TT4 to operate door open logic circuit 74. In operating, circuit 74 effects an opening of the transmission path between set 22 and receiver 26 to prevent the lobby visitor from keying in or simulating multifrequency tones to gain unauthorized entry to the apartment building. To insure the validity of the multifrequency digit, timing signals derived in master timing circuit 80 are supplied to logic circuit 74 via cable 8000C to delay opening of lobby door 23 until the high signal on lead 2TT4 has persisted for a predetermined interval. Upon expiration of the delay, circuit 74 sends a signal via lead 7010 to lock mechanism control circuit 66 to actuate dock lock mechanism 23 to effect an unlocking of door 21 and to allow the visitor to enter.

If the called apartment is equipped with a rotary dial-operated apartment set, such as set 35 and the apartment dweller positioned near that set wishes to admit the visitor, he must dial a dial pulse digit, illustratively the digit four, to effect lock release. The dial pulse digit four appears on line 3B2 as a series of short on-hook and off-hook voltages which via the switched signaling path of network 3SW and cables 3B and 302 are detected by line state detector 38 to operate logic circuit 74 over lead 3010. Actuation of lock mechanism 23 is then achieved under the control of the circuits 74 and 66 in the manner previously described.

A variety of call states and supervisory conditions of the lobby and apartment phones may give rise to the termination of the lobby-apartment connections and to the recycling of timing circuit 80. Specifically, reset logic circuit 67 operates to produce logic high outputs on cable 6000C in response to a variety of high signals, carried on cable 6100C from the outputs of control circuit 56 and delay circuits 55 and 68. These high signals represent the various supervisory conditions and call states. Signals appearing on cable 6000C serve to recycle the timing logic (not shown in FIG. 1) in timing circuit 80. In some call states, these signals also serve to effect a time-delayed disconnect of the lobby-apartment connection by presenting a logic high signal via lead 8130 to disconnect circuit 90. The latter circuit contains relay logic for disconnecting a lobby-apartment call under control of truck circuit control circuit 40.

One call state occurs after generator 37 has applied tone bursts to the apartment set, causing tone control circuit 56 to produce a logic high on cable 6100C to operate reset logic circuit 67. In this call state, only timing logic recycling but no call disconnection is effected. However, both timing logic recycling and disconnect circuit actuation occurs in those call states wherein the apartment phone is busy or is being rung. In response to such busy condition, detector 38 either enables lead 3010 and operates delay circuit 55 or enables lead 3020 and operates ring delay circuit 68 if ringing is in progress. Signals on cable 6100C from these delay circuits are thereupon provided to operate reset logic circuit 67. Both timing logic recycling and disconnect circuit actuation are also achieved if either lobby set 22 or the selected apartment set remains on hook, indicating termination of the call, or if door lock mechanism 23 is released by the action of door-open logic circuit 74. Finally, disconnect circuit actuation is provided in master timing circuit 80 which times the overall duration of the lobby-apartment call e.g., 25 seconds, to ensure that usage is not dominated by any one lobby visitor.

Detailed Description

Figure 2:
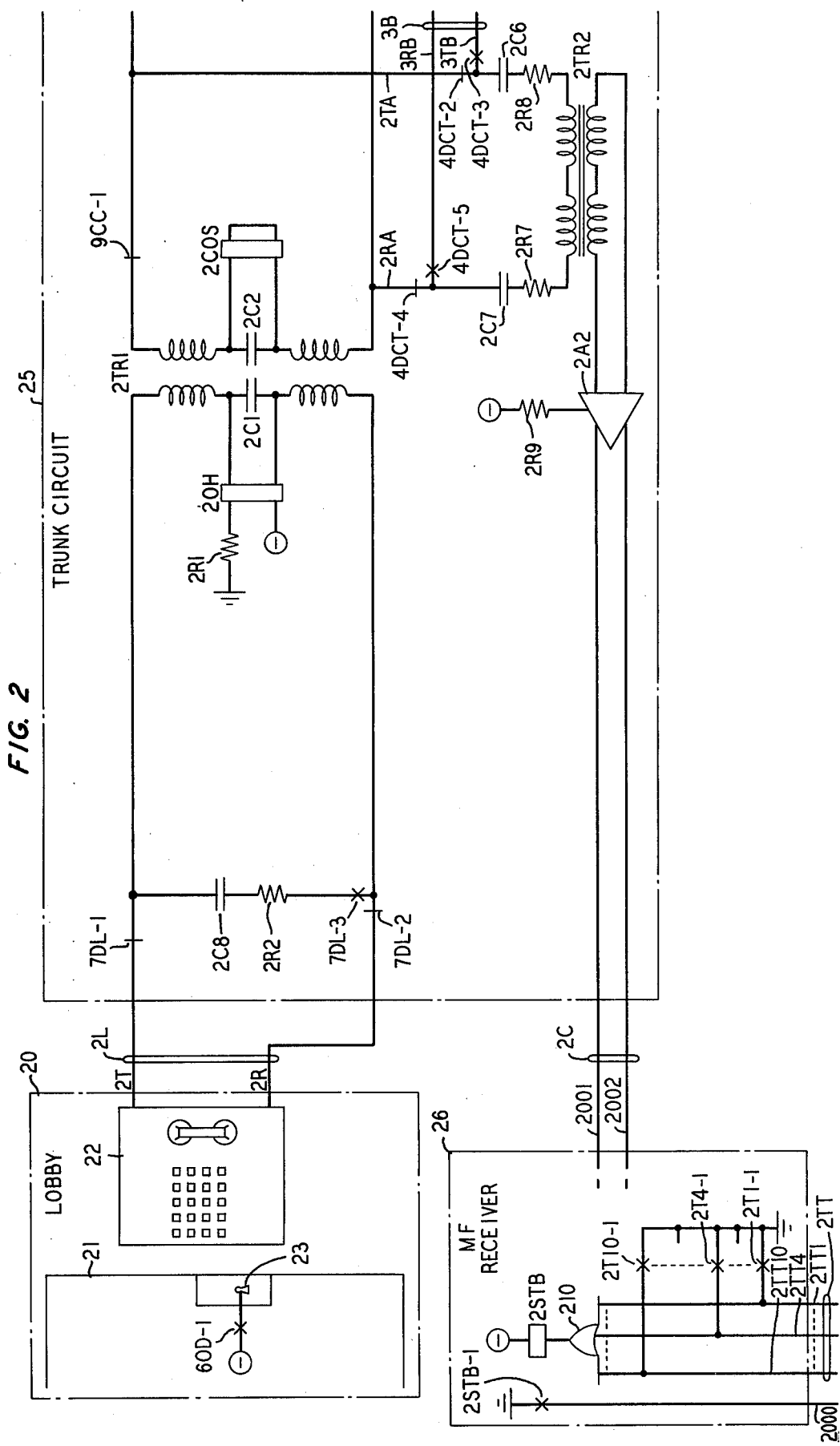
FIG. 2 shows a schematic portion of a trunk circuit.

In FIG. 2, tip and ring leads 2T and 2R, of line 2L, carry an off-hook voltage to trunk circuit 25 when the lobby visitor lifts the receiver of lobby set 22. This voltage operates a supervisory relay 20H on a path from lead 2T through contact 7DL-1, a winding of transformer 2TR1, upper winding of relay 20H and resistor 2R1 to ground and from lead 2R through contact 7DL-2, another winding of transformer 2TR1 and the lower winding of relay 20H to battery. The operation of relay 20H, in turn, provides a loop closure in circuit 25 (FIG. 3) on line 3L1 for signaling office 34CO to return dial tone. The loop closure is from office 34CO, tip lead 3T1, contacts 4DC2-7, 9CC-7 and 20H-3, inductor 3I1 and ring lead 3R1 to office 34CO.

Dial tone is returned from office 34CO via line 3L1 and through amplifier 3A1 to lobby set 22. No signal passes in the reverse direction from set 22 to office 34CO because amplifier 3A1 is unidirectional. The dial tone from office 34CO extends from lead 3T1, capacitor 3C4, and contact 4DC1-3 to an input of amplifier 3A1 and from lead 3R1 through capacitor 3C5 and contact 4DC1-8 to another input of amplifier 3A1. An output of amplifier 3A1 further extends dial tone via contact 4DC1-2, capacitor 3C3, contacts 2OH-2 and 9CC-1, transformer 2TR1, capacitor 2C2, resistor 3R6, and contact 4DC1-5 to another output of amplifier 3A1. A dial tone signal is then coupled through transformer 2TR1 to lobby set 22 via line 2L and contacts 7DL-1 and 7DL-2. When a visitor depresses a pushbutton of lobby set 22 corresponding to a desired apartment with which he wishes to communicate, an electronically prerecorded nine digit number, corresponding to the selected apartment, is automatically MF outpulsed under control of an assigned memory unit in set 22. The first two digits are employed for operating a particular select magnet and a particular hold magnet of switch 3SW in a conventional manner illustratively to connect the called apartment set 36 to a plurality of service circuits employed to effect lock release. The first two digits also control closure of a transmission path from lobby set 22 through trunk circuit 25 and line 3L1 to office 34CO. The remaining seven digits correspond to the directory telephone number of the selected apartment phone.

When the first digit is MF outpulsed over line 2L to circuit 25, a signal is coupled via transformer 2TR1 to MF receiver 26, but is not extended through trunk circuit 25 to office 34CO. The path, transmissionwise to office 34CO, is split at this time due to the unidirectional amplifier 3A1 and the open condition of contact 4DC2-2 in lead 3T1 and contact 4DC2-4 in lead 3R1. The first digit signal is extended from transformer 2TR1 to MF receiver 26 via line 2C, amplifier 2A2 and transformer 2A2 and a path including contact 9CC-1, lead 2TA, contact 4DCT-2. capacitor 2C6, resistor 2R8, upper winding of transformer 2TR2, resistor 2R7, capacitor 2C7, contact 4DCT-4, lead 2RA and thence, through transformer 2TR1 and capacitor 2C2. The multifrequency signal is coupled across transformer 2TR2 and presented to unidirectional amplifier 2A2 and thence to cable 2C to receiver 26.

Receiver 26 is illustratively of a type disclsed in L. A. Meacham et. al., U.S. Pat. No. 3,076,059, issued Jan. 29, 1963. Cable 2C is comprised of leads 2001 and 2002 and corresponds to receiver input line 12 of FIG. 1 of the Meacham et al. patent. As indicated in FIG. 3 of the Meacham et al. patent, the receipt of any multifrequency digit operates a "utilization circuit" in the digit receiver that corresponds to the particular received digit. In our illustrative embodiment, the utilization circuit is repesented by relays 2T1 through 2T10 (not shown) which correspond respectively to received digits one through nine and zero. To illustrate, if the digit one is received at receiver 26, relay 2T1 (not shown) is operated, thereby closing contact 2T1-1. Operation of any of relays 2T1-2T10 closes its respective contact to enable the output of OR gate 210 which in turn operates relay 2STB. Relay 2STB remains so operated for the duration of the received digit and creates a path from ground over contact 2STB on lead 2000 for activating state counter 41 of FIG. 4.

State counter 41 tracks digit outpulsing progress by updating its state for every received digit and for every interdigital period of the nine digits outpulsed for apartment set 36. The signal on lead 2000 is high in response to a received digit and an operation of relay 2STB and is otherwise low. A signal on lead 2000 is inverted at inverter 400 and presented to one input of EXCLUSIVE-OR gate 401. An inverted high signal is presented via the delay network comprised of resistor 4R2 and capacitor 4C3 to the other input of gate 401. Comparison of a signal with its delayed successor signal at EXCLUSIVE-OR gate 401 therefore provides a triggering clock pulse to counter 4CTR whenever there is a state transition on lead 2000 which occurs due to an end of an MF digit or an interdigital period.

Counter 4CTR is a decade counter wherein signals to clock input CL are effective to change the status of the counter if the signal to clock enable input CE is at a logic low. Counter 4CTR also has a CO output which goes high when a count of ten is completed. The output from CO is connected to trigger clock input CL of flip-flop 4F4. The latter and all other flip-flops of our embodiment are triggered at their clock input by a falling pulse edge and are reset at their R input by a logic one signal. Counter 4CTR and flip-flop 4F4 are connected to count 19 states, i.e., the trunk circuit seizure state and the 18 subsequent digit and interdigital periods.

Initially, when the lobby set is not in use, counter 4CTR is in its zero state and output $Q_0$ is high. Counter 4CTR shifts from this zero state to the "seizure" or first state after the lobby set 22 is off-hook. This is accomplished via AND gate 403 which is presented by high leads from $Q_0$ of counter 4CTR, the $\overline{Q}$ output of flip-flop 4F4, lead 6001 and lead 9000. The first two such leads are high when state counter 41 is in its zero state. Leads 6001 and 9000 go high when the lobby visitor takes the receiver of lobby set 22 off-hook. When off-hook occurs, relay 20H is operated, causing relay 9RLS to operate via a path from ground and through make contact 20H-7(9) and break contact 9CC-6. Since it is assumed for the purposes of our illustrative embodiment that a logic one or high signal is at a "ground" voltage level and that a logic zero or low signal is at a negative "battery" voltage level, it will be noted that operation of relay 9RLS in turn presents a logic one signal on lead 9000. This signal extends from ground over make contact 9RLS-7, inverter 900 and NAND gate 901. With regard to lead 6001, it will also be noted that when relay 20H is operated, a high signal is presented on lead 6001 via ground over make contact 20H-1(6) and through inverters 604 and 605. Thus, AND gate 401 is driven high, thereby clocking counter 4CTR into the seizure state.

When the first digit is received at receiver 26, a logic one signal is produced at the output of EXCLUSIVE-OR gate 401 via OR gate 402 to clock counter 4CTR. At the end of the duration of the first digit, counter 4CTR is again clocked to its third state to produce a high on output $Q_3$ which represents the beginning of the first interdigital period. The appearance of a clock pulse at input CL of counter 4CTR also provides a high signal to the D input of flip-flop 4F3 and of flip-flops 4F1 and 4F2 in trunk circuit control circuit 40. When the D input to these and other similar flip-flops in our illustrative embodiment goes high and the CL input of those flip-flops is clocked, an output is produced at Q which remains high until a logic one signal appears at the R input. Consequently, at the end of the first digit duration, a high is produced at output $Q_3$ of counter 4CTR which in conjunction with the high output of $\overline{Q}$ enables the output of AND gate 413 to clock flip-flop 4F1 while input D is also at logic one. The resultant output produced at Q of flip-flop 4F1 operates relay 4DC1 to battery which is then held over make contact 4DC1-7 and 9RLS-1 to ground.

Operation of relay 4DC1 affects the transmission path from lobby set 22 to office 34CO through trunk circuit 25 as follows. Dial tone, which had been presented from office 34CO over line 301 and through amplifier 3A1, is now cut off from lobby set 22 via contacts 4DC1-3 and 4DC1-8 at the inputs of amplifier 3A1, contacts 4DC1-2 and 4DC1-5 at the outputs of that amplifier and contact 4DC1-6 on the path from battery via resistor 3R5.

As a consequence of the removal of amplifier 3A1 and its associated impedance from the circuit, it is necessary that a termination of equal impedance be supplied between tip lead 3T1 and ring lead 3R1 to balance the entire circuit that extends from lobby set 22. A path is therefore extended from the right-hand side of transformer 2TR1 through contact 9CC-1, contact 20H-2, capacitor 3C3, contact 4DC1-1, resistor 3R10, contact 4DC2-3 and the right-hand winding of the transformer 2TR1. A similar impedance termination required by office 34CO is provided via a path from tip lead 3T1, capacitor 3C4, contact 4DC1-4, resistor 3R4, contact 4DC2-1, and ring lead 3R1 to office 34CO.

The second MF digit is received at receiver 26 and causes the output of OR gate 402 to clock counter 4CTR in state counter 41 and to produce a high on output $Q_5$ at the end of the duration of that digit. The high on output $Q_5$ in conjunction with the high on $\overline{Q}$ or flip-flop 4F4 produces a logic one output at AND gate 411 to clock flip-flop 4F2 while input D of that flip-flop is high thereby creating a high output at Q. The latter high output operates relay 4DC2 via contact 4DC2-8. Relay 4DC2 then locks via contacts 4DC2-5 and 9RLS-2 to ground. At the same time, during the second interdigital period when the $Q_5$ output of counter 4CTR is high, flip-flop 4F1 is reset via OR gate 414 and input R of flip-flop 4F1.

Returning to the transmission path through trunk circuit 25, it will be seen that operation of relay 4DC2 after the duration of the second digit has expired cuts through a bidirectional transmission path between lobby set 22 and office 34CO via contacts 4DC2-2 and 4DC2-4 in the tip and ring lead 3T1 and 3R1. At this time, the temporary impedance terminations that had been provided across resistors 3R10 and 3R4 after the outpulsing of the first digit are opened at contacts 4DC2-3 and 4DC2-1. The remaining seven digits that are to be outpulsed from set 22, in addition to being received at receiver 26, are also transmitted to office 34CO by way of trunk circuit 25 for establishment of a conventional switched telephone connection over line 3L3 to apartment set 36.

As the remainder of the digits are received at receiver 26, state counter 41 is advanced through the various digit duration and interdigital states. Thus, after the duration of the third received digit is complete and output $Q_7$ of counter 4CTR goes high, the output of OR gate 412 is enabled to reset flip-flop 4F2. When the call state advances to the fifth pulse period, output CO goes high clocking flip-flop 4F4 and producing a logic one at its Q output. Counter 4CTR then recycles and advances in accordance with the occurrence of successive call states. Thereafter, the occurrence of the 19th state corresponds to the period following the ninth digit outpulse period. In that state, the output of AND gate 407 is enabled thereby operating relay 4DCT via contact 4DC12. Relay 4DCT is then held from battery through its windings and over contacts 4DCT-6 and 9RLS-11. Enabling of the output of AND gate 407 signifies the completion of outpulsing from set 22. Lead 4005 derived from that output presents a high signal to the S input of flip-flop 4F4 and to the CE (clock enable) input of counter 4CTR to disable any further clock pulses from advancing either counter 4CTR or flip-flop 4F4. Operation of relay 4DCT after the outpulsing of all nine digits cuts off the path from trunk circuit 25 over cable 2C to receiver 26 at contacts 4DCT-4 and 4DCT-2. Contacts 4DCT-5 and 4DCT-3 connect the crosspoint switch 3SW to receiver 26 to enable signals generated from apartment set 36 to be processed and to achieve lock release. Such lock release signals are sent over the switched signaling path including line 3B3, the closed crosspoints of switch 3SW, cable 3B, transformer 2TR2, amplifier 2A2, and cable 2C to receiver 26.

For an understanding of how the crosspoints of switching network 3SW are operated, it is desirable to return to that point in time wherein the first two of the nine multifrequency digits were outpulsed from lobby set 22. Upon receipt of the first digit, receiver 26 operates one of relays 2T1 through 2T10 that corresponds to the outpulsed digit as priorly described. Assuming in our illustrative embodiment that the first outpulsed digit is a one, then contact 2T1-1 is operated producing a corresponding high on lead 2TT1 which produces a high at the output of the NAND gate 431 in switching network control circuit 42. At the same time, a high is produced at the output of OR gate 210 to operate relay 2STB which, in turn, produces a high on lead 2000 to advance state counter 41 from its first to its second state. A high therefore appears on the $Q_2$ output of counter 4CTR which, via AND gate 410, produces a high on lead 4001. This high is inverted at inverter 421, delayed via the network formed by resistor 4R1 and capacitor 4C1, reinverted at inverter 422 and presented at AND gates 451-460. The high on lead 4001 is also presented to the inputs of each of flip-flops 4F11-4F20 which functionally correspond to received digits one through nine and zero. Since in our illustrative embodiment the first digit to be received was a one, the high output of AND gate 431 and the delayed high output of inverter of 422 enable AND gate 451 to clock flip-flop 4F11. Select magnet 4SM1 which is thereby operated and held over a path extending from contacts 4SM1-1, 4SMR-1 and 9RLS-3 to ground.

When the second digit is received at receiver 26 and the $Q_4$ output of counter 4CTR in state counter 41 goes high, two things occur. First, lead 4003 at the output of OR gate 405 goes high to reset flip-flop 4F11 at input R. Furthermore, AND gate 406 is operated to produce a high on output lead 4002. This high, in turn, presents a high signal on all the D inputs of flip-flops 4F21-4F30 and produces a delayed output over inverter 423, the delay network consisting of resistor 4R3 and capacitor 4C2, and inverter 424. Assuming in our illustrative embodiment that the second outpulsed digit is a zero, then a high is produced on lead 2TT10 which in conjunction with the high lead 2000 enables AND gate 440. Thereafter when the delayed high appears at the output of inverter 424, AND gate 470 clocks flip-flop 4F30 to operate hold magnet 4HM10. This hold magnet is then held from battery over contacts 4HM10-1 and 9RLS-4 to ground.

Operation of magnet 4HM10 in turn closes contact 4HM10-2 to operate relay 4SMR. The latter relay, via contact 4SMR-1, releases the operated one of the select magnets, which in our illustrative embodiment is magnet 4SM1. The crosspoints in switch 3SW that are closed when both magnets 4SM1 and 4HM10 are operated are nevertheless conventionally held closed even after select magnet 4SM1 has released. Thus, operation of the select and hold magnets by the operation of network control circuit 42 closes a unique set of crosspoints in switch 3SW to provide a switched signaling path between selected apartment set 36 and a variety of service circuits in addition to the regular telephone connection through office 34CO. The service circuits are connected to cable 3B and include line state detector 38, tone generator 37 and, via an indirect connection through trunk circuit 25, receiver 26. By employing these service circuits, line 3L3 of apartment set 36 may be monitored to determine the call state and may be signaled to notify the apartment dweller of the presence of the lobby visitor. Switch 3SW, along with the above service circuits are preferably located near the lobby of the served apartment building such as in a utility room or basement of that building.

Line state detector 38 is connected to cable 3B via cable 303. It is illustratively comprised of two sets of threshold voltage detectors for determining whether a monitored line is in the on-hook or off-hook state and for determining whether that line is having a ringing signal supplied from office 34CO in response to a call origination. If an off-hook signal is detected on line 3L3, then a high, logic one output appears on lead 3010 at the output of line state detector 38. Similarly, if a ringing signal appears on line 3L3 a high, logic one output appears at lead 3020 of detector 38.

Tone generator 37 is connectable via cable 302 to leads 3TB and 3RB of cable 3B through contacts 5AT-1 and 5AT-2. Ground is supplied at contact 9RLS-10 which is closed after the lobby visitor has gone off-hook and relay 9RLS has operated. Generator 37 is eventually cut through to cable 3B to provide apartment set 36 with bursts of tone in several situations. These "call alerting" tones are supplied to notify the apartment dweller that a lobby visitor is attempting to communicate with him.

One situation necessitating the application of call alerting tone occurs if apartment set 36 is off-hook after the first two of the nine prestored digits associated with set 36 have been outpulsed but before all of the remaining seven directory digits have been outpulsed. It is then desirable to notify the apartment dweller that the lobby visitor is attempting to communicate with him.

Figure 4:
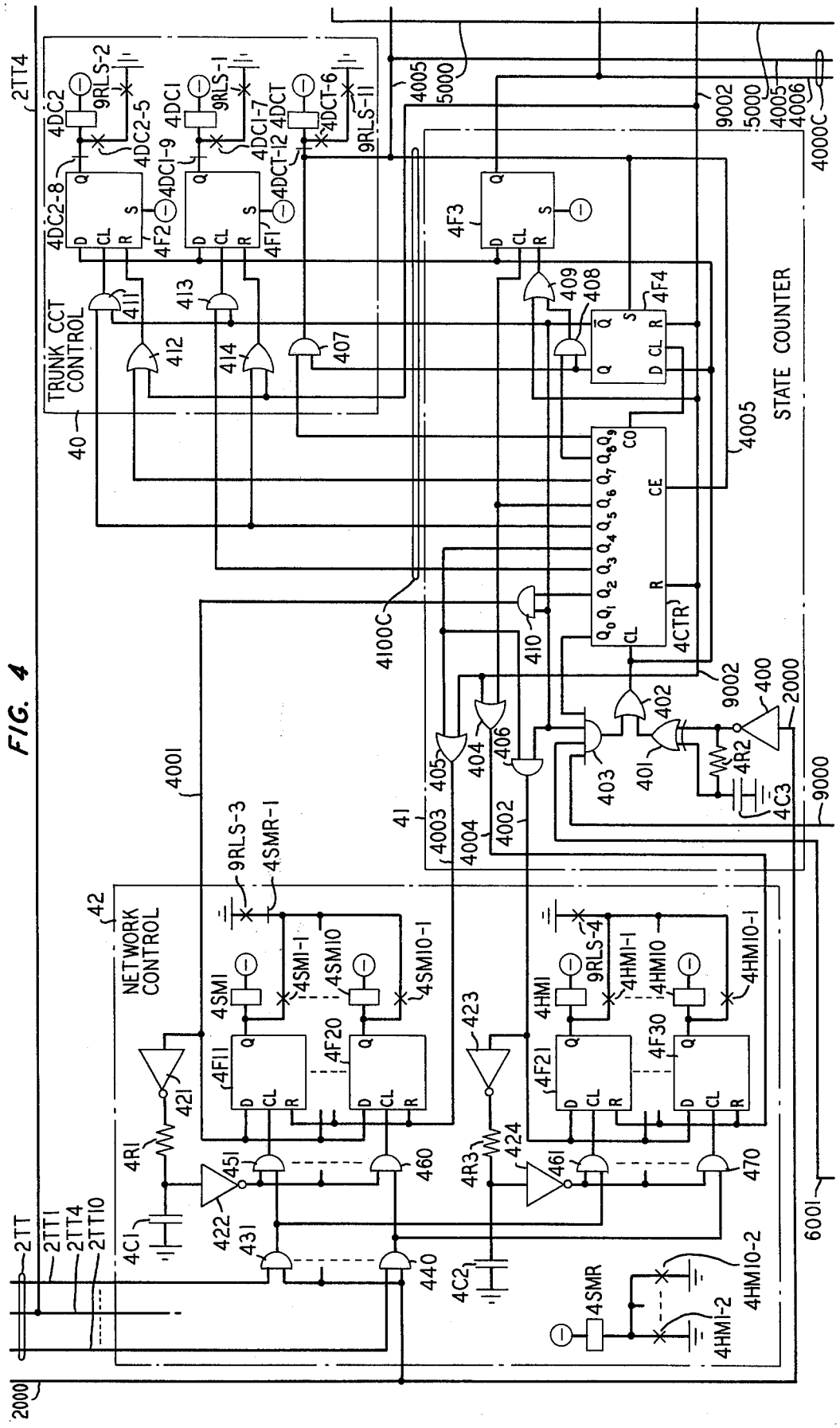
FIG. 4 depicts a state counter and network and trunk control circuits.
Figure 5:
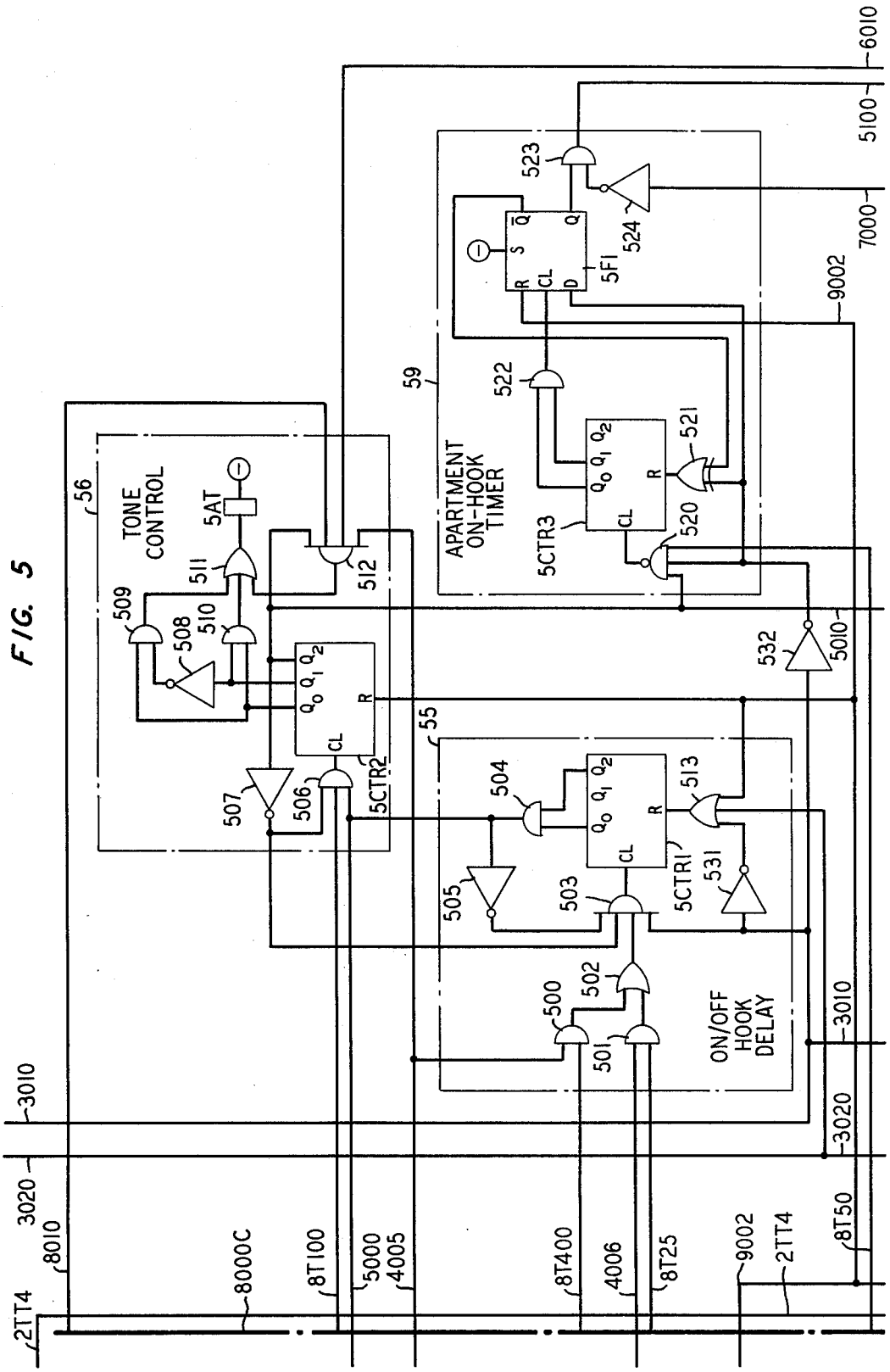
FIG. 5 shows delay and tone control circuits and an on-hook timer.
Figure 6:
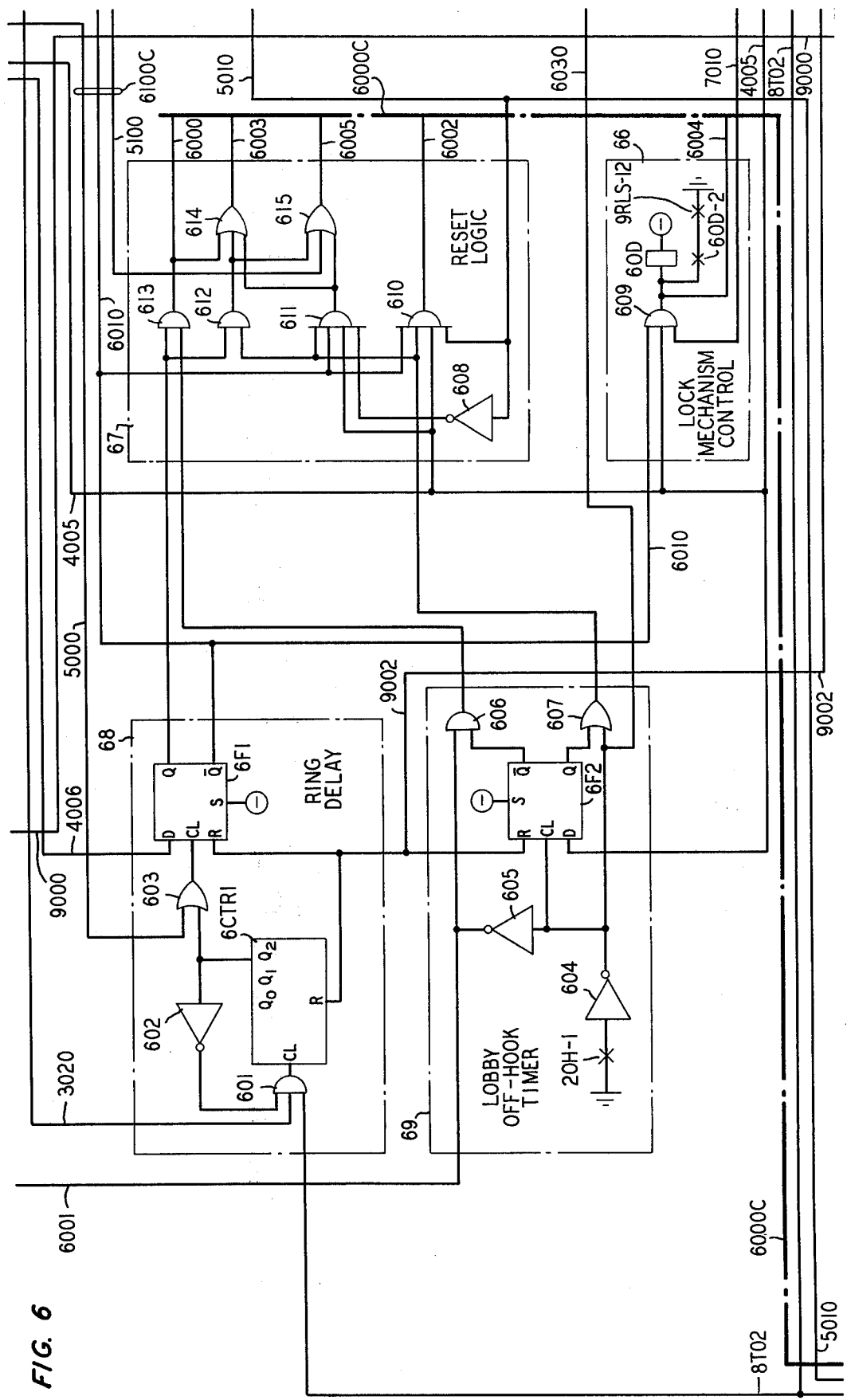
FIG. 6 depicts a ring delay circuit, a lock mechanism control circuit, reset logic, and a lobby off-hook timer.
Figure 7:
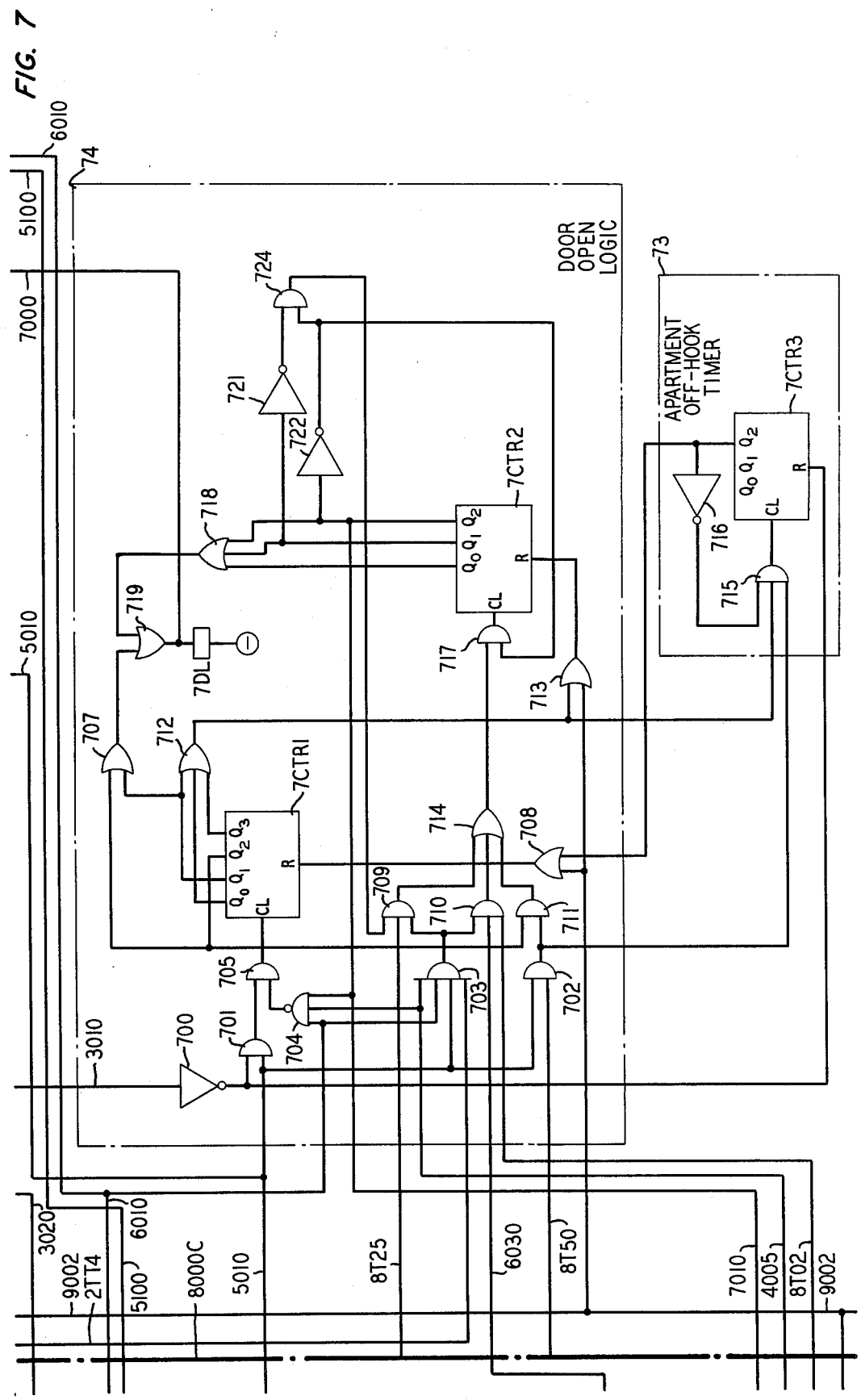
FIG. 7 displays a door open logic circuit and an apartment off-hook timer.
Figure 8:
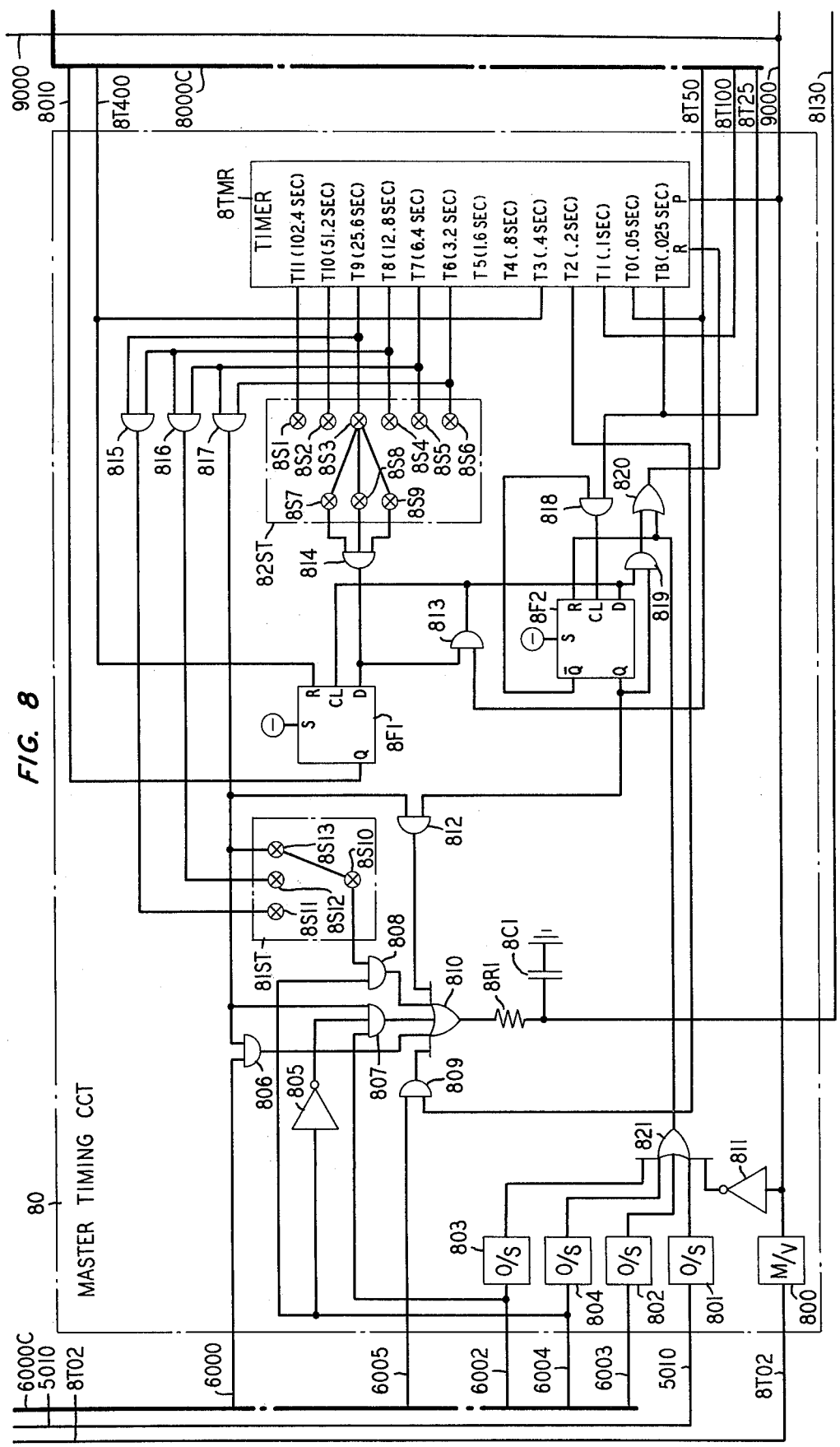
FIG. 8 shows a master timing circuit.
Figure 10:
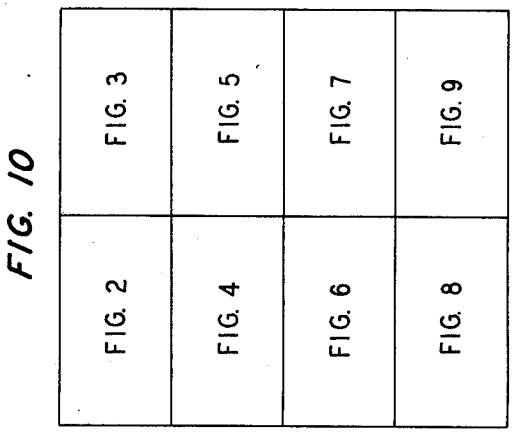
FIG. 10 depicts the position in which FIGS. 2-9 should be placed to show cooperation of the component circuits of the lock release control circuitry in our first illustrative embodiment.
Figure 9:
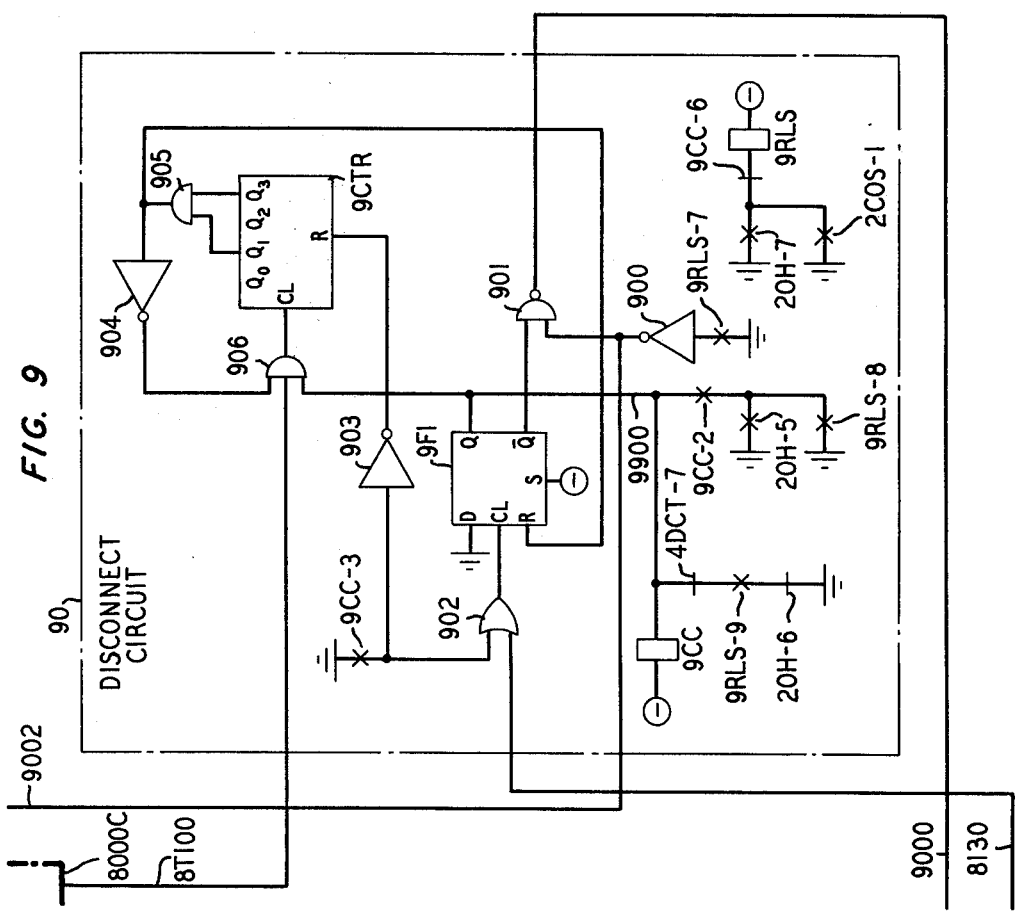
FIG. 9 depicts a disconnect circuit.

In this situation, a signal is provided over lead 4006 from state counter 41 that is high between the beginning of the third digit duration and the beginning of the ninth such digit duration. In FIG. 4, when counter 4CTR goes into its seventh state, and output Q6 goes high and flip-flop 4F3 is clocked while its D input is high. Lead 4006 at output Q of flip-flop 4F3 goes high and remains so until the combination of counter 4CTR and flip-flop 4F4 reaches the eighteenth state during the beginning of the ninth digit duration. In such state the output of OR gate 409 presents a high to reset input R of flip-flop 4F3 to remove the high output on lead 4006. Thus, lead 4006 remains high only during the outpulsing of the directory number of apartment set 36.

If, during the outpulsing of the seven digit directory number, state detector 38 detects an off-hook signal on line 3L3, a high is produced on lead 3010 which is fed to on/off-hook delay circuit 55. At the same time, lead 8T25 of cable 8000 derives a pulse train from master timing circuit 80 which is low illustratively for 25 ms and high for 25 ms. In such instance, the 25 ms pulse on lead 8T25 appears at output of AND gate 501 and OR gate 502 thereby enabling the output of AND gate 503 at the same rate. Counter 5CTR1 illustratively provides a 225 ms delay before the call alerting tone is applied. Upon expiration of the delay, the $Q_0$ and $Q_2$ outputs of counter 5CTR1 go high causing the output of AND gate 504 to go high and, via inverter 505, to inhibit AND gate 503 from further clocking counter 5CTR1.

At this point, the output of AND gate 504 enables AND gate 506 of tone control circuit 56 which is being pulsed every 200 ms by a signal on lead 8T100 derived from timing circuit 80. Counter 5CTR produces an output on AND gate 509 via outputs $Q_0$ and $Q_1$ of counter 5CTR2 and via inverter 508. The output of AND gate 509 enables OR gate 511 to operate relay 5AT to battery which, in turn, closes contact 5AT-1 and 5AT-2 to apply tones from tone generator 37 to apartment set 36 via switch 3SW. This tone illustratively is applied for 200 ms while the $Q_0$ output at counter 5CTR2 remains high and the $Q_1$ output thereof remains low. When the values of these outputs become reversed, relay 5AT is released and no tone is applied for 200 ms. When both the outputs $Q_0$ and $Q_1$ of counter 5CTR2 go high, tone is again applied to operate relay 5AT via AND gate 510 and OR gate 511. After this second 200 ms burst of tone, output $Q_2$ goes high and via inverter 507 inhibits a clocking of counter 5CTR2 at the output of AND gate 506. Furthermore, the low output at inverter 507 also inhibits AND gate 503 from further clocking delay counter 5CTR1 after alerting tone has already been applied.

The alerting tone is also applied in a second situation where apartment set 36 has not been in the off-hook state while outpulsing of a directory number is taking place. In such case, it is desirable to notify the apartment dweller that the call he is answering is lobby-originated. As indicated earlier, lead 4005 goes high upon completion of outpulsing of the ninth digit. Lead 4006 is low since flip-flop 4F3 has already been reset at the beginning of the ninth digit. Consequently, after the outpulsing of the directory number, a 400 ms pulse is presented from timing circuit 80 over cable 8000C to lead 8T400 to present a clock pulse of the same frequency via AND gate 500, OR gate 502 and AND gate 503. Delay counter 5CTR1 causes the output of AND gate 504 to go high after 3.6 seconds. This increased delay, as compared with the 225 ms employed when call alerting tone is applied while the directory number is being outpulsed, is necessary to give the apartment dweller time to lift the receiver of apartment set 36 to his ear and to listen. As in the previous situation, the end of the delay period of counter 5CTR1 disables AND gate 503 via inverter 505. The output appearing at AND gate 504 operates relay 5AT in a 200 ms on- 200 ms off - 200 ms on pattern as previously described.

In either situation that call alerting tone is being applied, if the state of line 3L3 suddenly changes to on-hook, then delay counter 5CTR1 is reset via lead 3010, inverter 531 and OR gate 513 to present a high to input R of counter 5CTR1. Counter 5CTR1 is also reset if during the outpulsing of the directory digits of set 36 ringing is applied to that apartment set. In the latter case, lead 3020 goes high to reset counter 5CTR1 via OR gate 513.

Turning to ring delay circuit 68, delay counter 6CTR1 responds to a high on output lead 3020 of line state detector 38 and to pulses derived from lead 8T02 at the output of multivibrator 800. After 14 ms have elapsed, the $Q_2$ output of counter 6CTR1 goes high to inhibit AND gate 601 via inverter 602. The delay thus produced serves to assure that the ringing signal amplitude detected at line state detector 38 is indeed ringing tone that is being applied to line 3L3 of set 36 and is not random transmission noise. In a similar fashion, a high output produced on lead 5000 at the output of AND gate 504 of on/off-hook delay circuit 55 ensures that the off-hook signal detected by line state detector 38 is not merely a flash on line 303. A high on either line 5000 or the output at $Q_2$ of counter 6CTR1 therefore produces a high at the output of OR gate 603 to indicate that line 3L3 is in some way busy, i.e., set 36 is either off-hook or is being rung.

If the aforementioned busy condition occurs during the outpulsing of the directory number of set 36, lead 4006 at the Q output of flip-flop 4F3 is high and maintains a high on the D input of flip-flop 6F1. The busy indication therefore clocks flip-flop 6F1 at input CL to produce a high at the Q output thereof indicating that line 3L3 is not ready for connection to lobby set 22. If, however, line 3L3 was not busy during directory number outpulsing, output $\overline{Q}$ of flip-flop 6F1 is high and is employed in reset logic circuit 57 in the manner to be described below.

Returning to FIG. 5, apartment on-hook timer 59 is provided for operation after call alerting tone has been applied and the $Q_2$ output at counter 5CTR2 has gone high. When this occurs and set 36 goes on-hook, lead 3010 is at a logic zero and produces a logic one via inverter 532 at the input of NAND gate 520. Delay counter 5CTR3 functions as a timer to ensure that once conversation has been initiated between the lobby visitor and apartment dweller, that an on-hook signal of less than 250 ms duration does not give rise to a call disconnect. NAND gate 520 is pulsed every 100 ms via lead 8T50 from cable 8000C derived from timing circuit 80.

After 250 ms the $Q_0$ and $Q_1$ outputs of counter 5CTR3 go high and enable the output of AND gate 522 to clock flip-flop 5F1. The D input of flip-flop 5F1 is kept high due to the output of inverter 532 indicating that set 36 is on-hook. The triggering of flip-flop 5F1 produces a logic one at the Q output thereof and a logic zero at the $\overline{Q}$ output. Thus, if output Q of flip-flop F51 is high, then set 36 has gone on-hook and disconnected. If, however, set 36 has gone off-hook again before 250 ms have elapsed, lead 3010 goes high and the output of inverter 532 goes low to inhibit the clocking of counter 5CTR3 via NAND gate 520. Since at this point the $\overline{Q}$ output of flip-flop 5F1 is high and the output of inverter 532 low, the output of EXCLUSIVE-OR gate 521 goes high to reset counter 5CTR3. The Q output of flip-flop 5F1, when high, produces a high on lead 5100 at the output of AND gate 523 to reset logic circuit 67 to be used in the manner to be described below.

Just as apartment on-hook timer 59 ensures against the inadvertent disconnection of the lobby apartment call due to a flash on line 3L3, lobby off-hook timer 69 (FIG. 6) similarly ensures that an on-hook or off-hook state at lobby set 22 endures long enough for a change of state to be recognized. It will be recalled that when the lobby visitor removes the receiver off-hook, relay 20H in trunk circuit 25 is operated. Operation of the latter relay presents a logic one signal via make contact 20H-1(6) in lobby off-hook timer 69. Conversely, if at any time lobby set 22 goes on-hook, then a high is presented at the output of inverter 604 to enable the output of OR gate 607. If in addition, this on-hook occurs after all the directory digits of apartment set 36 have been outpulsed from lobby set 22, then lead 4005 presents a high to input D of flip-flop 6F2 so that even if lobby set 22 eventually returns to the off-hook state, the previous on-hook condition is remembered. Accordingly, the Q output of flip-flop 6F2 remains high, thereby enabling the output of OR gate 607. If, on the other hand, lobby set 22 is off-hook and flip-flop 6F2 has not previously been clocked, then a high is presented at the output of AND gate 606 thereby indicating the continued off-hook status of lobby set 22. These lobby status indicators are employed in reset logic circuit 67 as will be described below.

Attention will now be focused on that pulse of the lobby apartment connection wherein the visitor and apartment dweller have conversed and the latter has decided to admit the former. If the apartment phone is equipped with multifrequency tone-generating pushbuttons, as is the case with set 36, then the called party need only depress a single pushbutton to generate a "door-opening" digit. This digit is transmitted over a path including cable 3B3, the closed crosspoints of switch 3SW, cable 3B, contacts 4DCT-5 and 4DCT-3, capacitors 2C7 and 2C6, resistors 2R7 and 2R8, transformer 2TR2, amplifier 2A2, and cable 2C to receiver 26. If instead, the apartment is equipped with a dial telephone, as illustrated by apartment set 35 in FIG. 1, then the door opening digit must be dialed, rather than keyed. Apartment set 35 is connected via cable 3B2 through switch 3SW and via cables 3B and 303 to line state detector 38. The latter service circuit serves to detect the pulses that comprise the dialed door-opening digit. In either case, whether multifrequency or dial pulse digits are generated by the apartment dweller, a convention is adopted in our illustrative embodiment that only the dialing of the digit four will allow the lobby visitor to gain entry to the apartment building. It is readily apparent that any such digit (or combination of digits) may be employed in lock release control circuitry 10. It is usually desirable, however, that the digit "one" not be employed as a dooropening digit since the danger of inadvertent generation of such digit or simulation thereof by regularly occurring transmission phenomenon may lead to the unwanted opening of lobby door 21.

Door open logic circuit 74 includes logic circuitry for recognizing a multifrequency or dial pulse digit generated at a selected apartment set. As an added precautionary measure, it also includes circuitry for splitting the transmission path between lobby set 22 and trunk circuit 25 to prevent a lobby visitor from outpulsing a door opening multifrequency digit from lobby set 22 or from manipulating the switchhook of lobby set 22 to simulate a door-opening dial pulse digit.

Referring to door open logic circuit 74 and assuming that the apartment dweller is positioned at pushbutton-equipped set 36, then the depressing of a pushbutton of that set generates a multifrequency digit which via switch 3SW is received at receiver 26 over the switched signaling path previously described. As a precaution, recognition of this digit is delayed by delay counter 7C7R2 which is actuated in the below-described manner.

Relay 2T4 (not shown) is operated in receiver 26 when the digit four has been recognized and closes contact 2T4-1 to present a high on lead 2TT4 to the input of AND gate 703. The remaining three inputs of AND gate 703, i.e., leads 5010, 6010 and 4005, also are high during this phase of this call. Lead 5010 from the $Q_2$ output of counter 5CTR2 is, at this point, high indicating that call alerting tone had previously been applied when the apartment dweller first answered the call. Lead 6010 derived from the Q output of flip-flop 6F1 of ring control circuit 68 is also high at this time indicating that during the outpulsing of the directory number, set 36 had not been busy. Lead 4005, derived from the output of AND gate 407 of trunk circuit control circuit 40 is also high at this time to indicate that the call is being answered in its post-outpulsing phase.

Thus, as soon as the multifrequency digit four is received at receiver 26, a high is presented at the output of AND gate 703 to the lower input of AND gate 709. The upper input of AND gate 709 is also high because counter 7CTR2 is initially in state zero and the $Q_1$ and $Q_2$ outputs thereof present low signals to inverter 721 and 722 respectively to produce a high at the output of AND gate 724. The middle input of AND gate 709 presents a 25 ms pulse on lead 8T25 of cable 8000C derived from master timing circuit 80. This 25 ms pulse is reproduced, successively at the outputs of AND gate 709, OR gate 714 and AND gate 717 to clock delay counter 7CTR2. The lower input of AND gate 717 is held high due to the initial low presented from the $Q_2$ output of counter 7CTR2 to inverter 722.

As previously mentioned, while the multifrequency digit is being recognized, it becomes necessary to cut off lobby set 22 from the transmission path across trunk circuit 25. Accordingly, logic highs are successively produced at the outputs of OR gates 718 and 719 to operate relay 7DL. Operation of relay 7DL disconnects lobby set 22 at break contacts 7DL-1(1) and 7DL-2(1) of leads 2T and 2R respectively in trunk circuit 25 (FIG. 2). Due to this temporary disconnect, an impedance termination is provided at the left end of trunk circuit 25 to ensure that transmission characteristics are maintained on line 3L1 with respect to central office 34CO. This impedance termination path includes a winding of transformer 2TR1, contact 7DL-3, resistor 2R2, capacitor 3C8, another winding of transformer 2TR1 and capacitor 2C1. A direct current path is however not provided and relay 20H therefore temporarily releases. The transmission path to office 34CO however continues to hold via contact 4DCT-1.

Returning to door open logic circuit 74, it will be recalled that after a 25 millisecond pulse, $Q_0$ of counter 7CTR2 goes high thereby operating relay 7DL temporarily to cut off lobby set 22 from trunk circuit 25. When the second 25 millisecond pulse clocks counter 7CTR2, output $Q_1$ goes high thereby producing a low at the output of inverter 721 and AND gate 724 to thereafter inhibit AND gate 709 from further presenting 25 ms clock pulses. At this point, however, AND gate 710 is activated to clock counter 7CTR2 with two pulses as follows. Since, as noted previously lobby set 22 is temporarily split from the voice transmission path, relay 20H is temporarily released and contact 20H-1 in timer 69 is opened thereby producing a high at the output of inverter 604 on lead 6030. Simulation of the digit four at lobby set 22 is therefore prevented if the high on lead 2774 resists during this temporary split while lead 6030 is high. In this way, the validity of the digit is verified. As a result of the continuing high on lead 2TT4 and thus at the output of AND gate 703 and due to the high on lead 6030, a two ms clock pulse train derived on lead 8T02 from timing circuit 80 produces a similar pulse train successively at the outputs of AND gate 710, OR gate 714 and AND gate 717. Counter 7CTR2 is thereafter pulsed very rapidly with two ms pulses until the $Q_2$ output goes high producing a low at the output of inverter 722 to inhibit AND gate 717. During the entire operation of counter 7CTR2, relay 7DL is maintained in its operated condition to keep lobby set 22 cut off from a transmission path in trunk circuit 25. It is noted that a release of relay 20H does not trigger release of the entire lock release control circuitry because relay 9RLS, which via lead 9002 controls such release, is maintained operated via contact 2C0S-1(9).

The $Q_2$ output of counter 7CTR2 also presents a high on lead 7010 to lock mechanism control circuit 66 to effect release of door lock mechanism 23 (FIG. 1). As previously mentioned, door lock mechanism 23 illustratively is of the type disclosed in the Buonsante patent and employs a microswitch (not shown) which is powered from battery via make contact 60D-1(1) and which corresponds to make contact 30D-1 shown in FIG. 3 of the Buonsante patent. Thus, recognition of a receipt of a multifrequency digit four presents a high on lead 7010 in the previously described manner which in conjunction with the normally-occurring high during a successfully completed call that appears on leads 4005, and 6010, produces a high output at AND gate 609. Relay 60D is thereby operated closing contact 60D-1(1) to effect release of door lock mechanism 23. Relay 60D also locks from battery through its winding and over make contacts 60D-2 and 9RLS-12 to ground.

If the selected apartment set is equipped with a rotary dial, processing of the door opening digit proceeds analogously. In our illustrative embodiment, apartment set 35 (FIG. 1) is rotary dial-equipped and connected via line 3B2 (FIG. 1) to switch 3SW. The pulses comprising the door open digit are counted at counter 7CTR1 with recognition of the digit being delayed at counter 7CTR2 to ensure that a higher valued digit does not effect a lobby door lock opening when counter 7CTR1 reaches the count of four.

Specifically, if the digit four is dialed out of set 35 via switch 3SW and its constituent dial pulses are detected as a series of on- and off-hook signals at line state detector 38, then a series of logic zero signals appears on lead 3010 which appears at a series of logic highs at the output of inverter 700. These successive high pulses correspond to the number of the digits dialed and are counted at counter 7CTR1 in the manner described hereinafter.

Since a high on lead 5010 indicates that call alerting tone has already been applied, then the output at AND gate 701 goes high for the duration of each pulse that comprises the digit. At these times a high is presented at the upper input of AND gate 705. A high is maintained on the lower input of AND gate 705 until such time as the $Q_2$ output of delay counter 7CTR2 produces a high on the rightmost input of NAND gate 704. The remaining two inputs to NAND gate 704, leads 6010 and 4005, remain high once the call has progressed to the conversation state as indicated previously. Counter 7CTR1 counts the pulses comprising the dial pulse digit generated from apartment set 35. When the second pulse is counted, output $Q_1$ of counter 7CTR1 goes high producing a high at the output of OR gate 707 which, in turn, presents a high at the output of OR gate 719 to operate relay 7DL. Operation of relay 7DL cuts off lobby set 22 from the transmission path in trunk circuit 25 as previously described with regard to a MF generated pulse, to prevent the lobby visitor from manipulating the switchhook on lobby set 22 and simulating the door opening dial pulses.

When counter 7CTR1 counts the fourth digit, output $Q_2$ goes high via OR gates 707 and 719 and continues to hold relay 7DL operated. The high on the $Q_2$ output is also presented to AND gate 711 which via AND gate 702, illustratively produces a 50 ms clock pulse derived over lead 8T50 from timing circuit 80. This 50 ms pulse is successively reproduced at the outputs of OR gate 714 and AND gate 717 to counter 7CTR2. The function of this counter is to provide a short delay, illustratively 300 milliseconds, to ensure that if a digit greater than four was dialed out by any apartment dweller, that lobby door 21 is not inadvertently opened. After 300 milliseconds, the $Q_2$ output of counter 7CTR2 goes high producing a low on inverter 722 to inhibit further clock pulses from appearing at the output of AND gate 717. Lead 7010, derived from the $Q_2$ output of counter 7CTR2, produces a high at the output of AND gate 609 in lock mechanism control circuit 66 to operate relay 60D, thereby effecting release of door lock mechanism 23 in the manner previously described.

As previously mentioned, when the door-opening digit is dial pulse-generated, counter 7CTR2 acts as a delay to ensure that the digit is a four and is no other digit. If, however, a digit other than four has been dialed, the output of OR gate 712 goes high to reset counter 7CTR2 at its R input via OR gate 713 which, in turn, results in release of relay 7DL, restoration of the connection between lobby set 22 and trunk circuit 25 and reoperation of relay 20H.

The high at the output of OR gate 712 also triggers operation of apartment off-hook timer 73. The latter timer is actuated by a 50 ms pulse produced at an output of AND gate 702 and presented at the output of AND gate 715 to clock delay counter 7CTR3. After a 350 ms delay, the $Q_2$ output of counter 7CTR3 inhibits further pulses from clocking the counter and produces a high output which via OR gate 708 resets pulse counter 7CTR1. If during the 350 ms delay interval a subsequent on-hook pulse or a flash on the transmission path produces a momentary on-hook state on set 35, then counter 7CTR3 is reset via inverter 700.

Attention will now be focused on timing circuit 80 which via cable 8000C supplies timing pulses of various repetition rates to the counters and flip-flops situated throughout lock release control circuitry 10. Timing circuit 80 includes timing logic circuitry for generating pulses of various repetition rates, circuitry responsive to reset logic circuit 67 for producing a signal at the output of OR gate 821 to recycle the timing logic circuitry and circuitry controlled by reset logic circuit 67 for producing a signal at the output of OR gate 810 to activate disconnect circuit 90. Of the foregoing three circuit portions of timing circuit 80, the timing logic circuitry will be discussed first.

At the core of the logic timing circuitry is timing circuit 8TMR which illustratively includes a square-wave producing pulse generator (not separately shown) which is powered by a high on lead 9000 and a digital binary counter (not separately shown) which is clocked by the output of the pulse generator to produce outputs of successively lower repetition rate. Thus, output $T_B$ of timer 8TMR produces a square-wave, 25 ms pulse. Outputs $T_0$ - $T_{11}$ similarly produce square-wave pulses whose high or logic one portion is equal to the value indicated alongside each output terminal. Pulses of intermediate duration may also be provided by logically combining combinations of the terminal outputs of timer 8TMR. Thus, AND gates 815, 816 and 817 provide square-wave pulses wherein the logic one duration is maintained for 38.4, 19.2 and 9.6 seconds respectively.

All timing signals used to clock the various flip-flops and counters throughout lock release control circuitry 10 are derived via cable 8000C from timer 8TMR and, in the case of the two ms pulse, from the output of multivibrator 800. The latter multivibrator is powered by the high signal on lead 9000 which persists throughout call establishment and conversation.

Strapping frames 81ST and 82ST are employed to provide flexibility in utilizing timing pulses. For example, in our illustrative embodiment, frame 82ST has terminals 8S7-8S9 all strapped to terminal 8S3 to derive a pulse at the output of AND gate 814 which endures for 25.6 seconds. This pulse is utilized to trigger flip-flops 8F1 and 8F2 to provide overall timing for a lobby-apartment call connection so that prolonged conversations are prevented. If a call of longer duration is desired, all that need be changed is the strapping arrangement on frame 82ST to produce a pulse at the output of AND gate 814 having a different repetition rate.

In our illustrative embodiment, operation of the overall call time proceds normally until 25.6 seconds have elapsed. At this point, a high is produced at the output of AND gate 814 which is presented to the D input of flip-flop 8F1. Almost immediately thereafter, a 50 ms clock pulse is presented via AND gate 813 to the clock input of flip-flop 8F1. The high presented at the Q output of that flip-flop onto lead 8010 is sent via cable 8000C to tone control circuit 56 as an input to AND gate 512. This high output is employed to provide the apartment dweller with a short burst of tone, illustratively of about 400 ms, to warn him that the call is about to be terminated automatically. The remaining inputs to AND gate 512, leads 4005, 5010 and 6010 are high during the conversation stage of a call, as previously indicated. Thus, as long as the Q output of the flip-flop 8F1 is high, relay 5AT is operated via OR gate 511 to provide warning tone to the selected apartment's set.

Returning to timing circuit 80 and the operation of the overall call time, it will be noted that the 50 ms pulse derived at the output of AND gate 813 after timer 8TMR has progressed 25.6 seconds, presents a high to the D input of flip-flop 8F2. That flip-flop is clocked by a 25 ms clock pulse via AND gate 818 which is held high by the $\overline{Q}$ output of flip-flop 8F2. As a result, a high is produced at the Q output of 8F2 which during the next 50 ms pulse provides a recycling signal to timer 8TMR via AND gate 819 and OR gate 820 to reset timer 8TMR. After 400 additional ms the output at terminal $T_3$ of timer 8TMR goes high and resets flip-flop 8F1 thereby producing a low on lead 8010. This low releases relay 5AT and removes the tone applied from tone generator 37 via contacts 5AT-1 and 5AT-2 over switch 3SW to the selected apartment set.

From the time that timer 8TMR is recycled, an additional 9.6 seconds elapses before disconnect circuit 90 is actuated. Accordingly, when 9.6 additional seconds have elapsed, the output of AND gate 817 goes high to produce successive high outputs at AND gate 812 and OR gate 810. This high signal, slightly delayed by the presence of the delay circuit comprised of resistor 8R1 and capacitor 8C1, is presented over lead 8130 to disconnect circuit 90 which operates in a manner to be described below.

The remaining two circuit portions of circuit 80 may be subdivided into those logic circuits that feed OR gate 810 to effect call disconnect over lead 8130 and those logic circuits that feed OR gate 821 to effect recycling of timer 8TMR and its associated logic circuitry. To gain an understanding of these circuit portions, reference must first be made to reset logic circuit 67 (FIG. 6) which, via outputs 6000 and 6002-6005, carry logic one signals, in response to the occurrence of specific call conditions to be enumerated hereinafter, to control operation of both of these circuit portions.

One such call condition arises if the selected apartment set is busy, i.e., is either off-hook or being rung on an outside call, and lobby set 22 remains off-hook. In such case, the Q output of flip-flop 6F1 and the output of AND gate 606 of lobby off-hook timer 69 are both high causing output lead 6000 of AND gate 613 to go high and, via OR gate 614, producing a similar high on lead 6003. The high on lead 6003 triggers a pulse at the output of one-shot 802 which produces a high pulse at the output of OR gate 821 to recycle overall-timing flip-flop 8F2 and, via OR gate 820, timer 8TMR. The call is then held for an additional 9.6 seconds until the output of AND gate 817 goes high. When this occurs, AND gate 806, fed by the high on lead 6000, produces a high at the output of OR gate 810. This high is sent via the delay network comprised of resistor 8R1 and capacitor 8C1 to disconnect circuit 90 to release the call in the manner to be described below.

Other call states also produce a high on lead 6003 to effect recycling of timer 8TMR via one-shot 802 and OR gate 821. One such call state arises if during the outpulsing of the seven directory digits the selected apartment set was busy, thereby producing a high on the Q output of flip-flop 6F1, and lobby set 22 has gone on hook for more than a brief instant so that the output of OR gate 607 is high. In such case, a high is produced on the 6003 via AND gate 612 and OR gate 614 to recycle timer 8TMR. However, because the lobby set receiver has been hung up, disconnect of the call is virtually immediate and is accomplished by the appearance of a high signal on lead 6005 via the outputs of AND gate 612 and OR gate 615. The high on lead 6005 produces a high at the output of AND gate 809 after 200 ms which via OR gate 810 and the delay network actuates disconnect circuit 90.

Another call state that produces recycling of timer 8TMR over lead 6003 and rapid call disconnect within 200 ms over lead 6005 is encountered if the lobby visitor has hung up after outpulsing on an otherwise completable (not busy) call and call alerting tone has not yet been applied. In this call state, a high at the output of AND gate 611 produces enabling highs on leads 6003 and 6005. AND gate 611 is enabled when its four inputs, lead 6010, the output of OR gate 607, lead 4005 and the output of inverter 608 all go high. The high on lead 6010 indicates that the selected apartment set was not busy during directory outpulsing. OR gate 607 is enabled to indicate that lobby set 22 is on hook and lead 4005 goes high when the call as monitored at state counter 41 is in its postoutpulsing state. The signal on lead 5010 as inverted by inverter 608 indicates that call alerting tone has not yet been applied. The aforementioned four high input signals produce a high signal at the output of AND gate 611 to reset timer 8TMR and to effect call disconnect within 200 milliseconds.

Another call state that achieves rapid call disconnect within 200 milliseconds, occurs when the selected apartment set goes on hook for more than 300 ms. As previously pointed out, apartment on-hook timer 59 produces a high on the Q output of flip-flop 5F1 if the apartment on-hook state persists for more than 300 ms. The high on the output of flip-flop 5F1 appears on lead 5100 at the output of AND gate 523 unless door open control circuit 74 is in the process of recognizing a door-opening digit and has operated relay 7DL to temporarily cut off lobby set 22 from the transmission path in trunk circuit 25. In the latter case, the apartment dweller usually hangs up after outpulsing the door-opening digit. In order to prevent an inadvertent rapid call disconnect from occurring when lock release was intended, a high signal at the output of OR gate 719 in door open logic circuit 74 is presented over lead 7000. This signal, when inverted over inverter 524, inhibits AND gate 523 from producing an apartment on-hook timeout signal on lead 5100. In all cases in which apartment on-hook timeout actually does occur, a high appears on lead 5100. This high enables output lead 6005 of OR gate 615 and sends an actuating signal via OR gate 810 to disconnect circuit 90.

Another call state that need be considered arises if the lobby visitor has hung up after directory number outpulsing on an otherwise completable call and call alerting tone has already been applied. This state differs from the previously described state only in that the apartment dweller has been notified of a presence of a lobby visitor by application of the alerting tone. In such case, AND gate 610 is enabled to produce a high on lead 6002 which via one-shot 803 and OR gate 821 recycles timer 8TMR and overall timing flip-flop 8F2. Since the apartment dweller has been notified that a lobby visitor is attempting to communicate with him, he must be given sufficient time prior to call disconnect to generate a door-opening digit, illustratively the digit four. The delay interval provided for this purpose in our illustrative embodiment is 9.6 seconds and is derived from the output of AND gate 817. Since, during this call state, no high appears on lead 6004, a high is presented at the output of inverter 805 to produce successive high signals at the outputs of AND gate 807, OR gate 810 and the delay network comprised of resistor 8R1 and capacitor 8C1.

Turning to yet another call state, if the call has progressed to the point where a door-opening digit has been recognized by door open logic circuit 74 and relay 60D in lock mechanism control circuit 66 has been operated, then a high is presented over lead 6004 to trigger one-shot 804 thereby producing a timing logic recycling pulse at the output of OR gate 821. The high on lead 6004 also produces a low at the output of inverter 805 to inhibit a disconnect pulse from being produced at the output of AND gate 807.

When the call is in the last aforementioned state, the lobby visitor must be given sufficient time to open the lobby door 21. This delay interval may be flexibly derived at strapping frame 81ST. In the illustrative embodiment, pulses having a logic one output of a duration of 9.6 seconds are derived at the output of AND gate 817 via the strap connecting terminals 8S13 to 8S10 to produce a high at the right input of AND gate 808. As a result, a disconnect signal is generated via OR gate 810 to actuate disconnect circuit 90. Strapping frame 81ST may be conveniently rearranged to provide delay intervals of longer duration.

Timer 8TMR and timing flip-flop 8F2 are also reset if a call alerting tone has already been applied and lead 5010 at the $Q_2$ output of counter 5CTR2 of tone control circuit 56 goes high. This high signal triggers one-shot 801 to produce a recycling signal at the output of OR gate 821.

Attention will now be focused on the operation disconnect circuit 90. As indicated earlier, when lobby set 22 goes off hook, relay 9RLS is operated and, via contact 9RLS-7, inverter 900 and NAND gate 901, places a high on lead 9000. As long as lead 9000 is high, a low is maintained at the output of inverter 811 to prevent a recycle pulse from appearing at the output of OR gate 821. As long as the call is in the establishment or conversation phase and either one of relays 20H or 2COS has operated, relay 9RLS remains operated and maintains a logic low on lead 9002 at the output of inverter 900. This low signal is fed into the reset input of various counters and flip-flops throughout lock release control circuitry 10.

When a disconnect signal is received over lead 8130, flip-flop 9F1 is clocked via OR gate 902 to produce a high on lead 9900, thereby operating relay 9CC. Relay 9CC is also operated if lobby set 22 goes on hook prior to the completion or outpulsing of the directory number of the selected apartment set. Relay 9CC is initially held to ground via make contact 9CC-2 and either make contact 20H-5 or 9RLS-8. However, as soon as relay 9CC operates, relay 9RLS is released due to break contact 9CC-6. As a result, the path from ground to the input of inverter 900 is opened at make contact 9RLS-7 to produce a high on lead 9002. This high, feeds the reset inputs of counters 4CTR, 5CTR1, 5CTR2, 6CTR1, 7CTR1, and 7CTR2 and flip-flops 4F1-4F4, 5F1 and 6F1-6F2. Release of relay 9RLS also releases holding paths for hold magnets 4HM1-4HM10, relays 4DC1, 4DC2 and 4DCT and tone generator 37 as a result of the opening of make contacts 9RLS-4(4), 9RLS-1(4), 9RLS-2(4), 9RLS-11(4) and 9RLS-10(3) respectively.

Delay counter 9CTR provides a two-second delay to allow all relays in lock release control circuitry 10 ample time to release. When a disconnect signal appears on lead 8130 and, via lead 9900, brings about the operation of relay 9CC as previously described, then a low signal is presented to the R input of counter 9CTR from ground via make contact 9CC-3 and inverter 903. Counter 9CTR is thus enabled to receive a 100 ms clock pulse via AND gate 906 from lead 8T100. After two seconds have elapsed, outputs $Q_1$ and $Q_3$ of counter 9CTR go high to produce a logic one at the output of AND gate 905. This high output, via inverter 904 inhibits further clock pulses at AND gate 906, resets flip-flop 9F1 and removes the high on lead 9900 to release relay 9CC in preparation for a new lobby-apartment call. The low on lead 9900 places a low on terminal P of timer 8TMR to disable the 25 ms pulse generator. Also, the low on lead 9000, via inverter 811 and OR gate 821, generates a recycling pulse to reset timer 8TMR and flip-flop 8F2 to enable subsequent reuse of the circuitry.

In addition to the disconnect circuit action that occurs in response to a high on lead 8130, disconnect circuit action occurs if the lobby set goes into the onhook state before the seven digit directory number has even begun to be outpulsed. In such case, relay 9CC is operated from a path that extends from ground via break contact 2OH-6, make contact 9RLS-9 and break contact 4DCT-7. Flip-flop 9F1 is clocked by a path that extends from ground over make contact 9CC-3 and through OR gate 902. Any remaining disconnect circuit actions are identical to those described in connection with a disconnect that originates due to a high signal on lead 8130.

The above-described lock release control circuitry may, in another illustrative embodiment, be employed in an apartment building having multiple lobbies. FIG. 11 shows relay logic preference circuitry for queueing requests for service originated by lobby visitors positioned at different lobbies in the same apartment building or complex. For the purpose of illustration, it is assumed that the apartment building contains three lobbies, lobby 20A, lobby 20B (not shown) and lobby 20C.

In the multiple-lobby configuration, leads 11T1 and 11R1, connected to lobby set 22A; leads 11T3 and 11R3, connected to lobby set 22C and the tip and ring leads connected to other lobbies in the building or complex are multipled onto leads 2T and 2R. The latter two leads are connected to trunk circuit 25 which along with disconnect circuit 90 is partially reproduced in FIG. 11.

If lobby set 22A is the first of the three lobby sets to go off-hook, then seizure of trunk circuit 25 and the other equipment units of the lock release control apparatus is achieved as follows. Relay 11LS1 operates on a path extending over tip lead 11T1, contacts 11TL1-1 and 11CL1-2, and an upper winding of the relay to battery and over ring lead 11R1 through contacts 11TL1-6 and 11CL1-3, a lower winding of relay 11LS1, and resistor 11R11 to ground. Operation of relay 11LS1, in turn, operates relay 11LG1 by a path extending from ground through contacts 11LS1-1, 11TL1-4, 11LG1-4, and 11G0-1. As a result, relay 11G0 is operated due to the closure of contact 11LG1-3. A holding path for relay 11LG1 is thereafter extended over contact 11LG1-5. Operation of relay 11LG1, in turn, operates relay 11CL1 via a path from ground including contacts 9CC-4, 20H-8, 11CLG-1 and 11LG1-2. Relay 11CL1 is then held over its contact 11CL1-5. The operation of relay 11CL1 results in both the operation of relay 11CLG via contact 11CL1-8 and the release of relay 11LS1 due to contacts 11CL1-2 and 11CL1-3. The release of relay 11LS1 effects the successive release of relays 11LG1 and 11G0.

When relay 11CL1 operates, tip and ring leads 11T1 and 11R1 are cut through to tip and ring leads 2T and 2R in trunk circuit 25 thereby causing operation of relay 2OH and subsequent call setup in the manner previously described with regard to a single lobby configuration in FIGS. 2-9. If after the call has been established, release of lock mechanism 23A is desired, it is achieved by a path from battery and contacts 60D-1 and 11CL1-9. If in disconnect circuit 90 a signal appears over lead 9900 or is extended over contacts 20H-6, 9RLS-9 and 4DCT-7 to operate relay 9CC, then ground is removed from the holding path of relay 11CL1 due to the opening of contact 9CC-4. Relay 11CL1 is a slow-to-release relay which illustratively is released in 350 ms. This slow-to-release action holds relay 9CC over a path from ground over make contacts 11CL1-11 and 9CC-2. When the call is finally released and relay 11CL1 also has released, then relay 9CC releases due to the opening of contact 11CL1-11 and is ready to accept a bid for operation of one of relays 11CL1-11CL3 via contact 9CC-4.

Relay logic circuitry is also provided to prevent the automatic reseizure of trunk circuit 25 from a lobby set at which a lobby visitor has left the receiver dangling off hook after the call has been completed due to reoperation of relays 11LS1 and 11LG1. To prevent this from occurring, relays 11TL1-11TL3 are provided. At the initiation of call completion, when relay 9CC is operated, relay 11TL1 is also operated via contacts 9CC-5 and 11CL1-7. This circuit action results in the re-operation of relay 11LS1 via contacts 11TL1-2 and -5. Operation of relay 11LS1, in turn, provides a holding path for relay 11TL1 via contacts 11TL1-3 and 11LS1-1. When slow-to-release relay 11CL1 is finally released, operation of relay 11LG1 as previously described is prevented by the presence of contact 11TL1-4. Thus, relay 11TL1 functions as a device for remembering that the receiver of its associated lobby set 22A, has been left dangling off-hook.

To illustrate how bids for service are gueued in a multiple-lobby configuration, it will be assumed that lobby set 22A was first to bid for service and has operated the circuitry in the manner previously described. It will further be assumed that during the operation of this circuitry another lobby visitor positioned at lobby set 22C placed that set in the off-hook state, thereby bidding for access to trunk circuit 25. When that occurs, relays 11LS3 and 11LG3, associated with lobby 20C, are operated in a manner analogous to the operation of relays 11LS1 and 11LG1. Relay 11G0 operates via contact 11LG3-3. However, relay 11CL3, associated with lobby set 22C, cannot be operated due to the presence in its operating path of contact 11CLG-1. The latter contact is opened because relay 11CLG is still being held operated over contact 11CL1-8 with relay 11CL1 being held operated to serve lobby set 22A.

After completion of the call from lobby set 22A to its associated selected apartment set, relays 11CL1, 11CLG and 9CC are released. If lobby set 22A has not gone on-hook by the end of the call then relay 11TL1 operates via make contacts 9CC-5 and 11CL1-7 before relays 11CL1 and 9CC release. Relay 11LS1 operates on a path including tip lead 11T1, contact 11TL1-2 and the upper winding of the relay to battery. A lower path includes ring lead 11R1, contact 11TL1-5, the lower winding of the relay and resistor 11R11 to ground. Relay 11LS1 operated provides a hold path for relay 11TL1 via contacts 11TL1-3 and 11LS1-1 to ground. Relay 11TL1 operated opens the operate path of relay 11LG1 by means of contact 11TL1-4 and remains operated as long as lobby set 22A remains off hook. Under this condition relay 11LG1 cannot operate and lobby 20A remains out of the queue. Upon release of relay 9CC, relay 11CL3 is operated over contacts 9CC-4, 20H-8, 11CLG-1, 11G1-1, 11LG2-1 and 11LG3-1. Thereupon, operation of the remaining relay logic circuitry proceeds in a manner analogous to that encountered in the servicing of the call originating from lobby set 22A.

Thus, we have shown two illustrative embodiments of our invention in which lock release control at a lock controlled access point is achieved in response to a signal from an authorizing telephone set without distortion or misinterpretation of that signal. We have implemented this distortion-free signaling by providing a switching network and a plurality of service, control, delay and logic circuits to establish a dedicated, switched signaling path between the authorizing telephone set and the lock mechanism in addition to a conventional telephone speech path between telephone sets located at the access and authorizing points respectively. Moreover, by the inclusion in our circuitry of an additional service circuit and a control circuit we have implemented the application of an alerting tone over the switched signaling path to notify the authorizing party, when certain predetermined call states arise, of a call attempt from the access point without necessitating equipment modifications at a telephone central office.

It will be apparent to those of ordinary skill in the art that numerous modifications of the illustrative embodiments herein described may be made without departing from the spirit or scope of the invention. Thus, for example, not all of the apartments in the building need be served by the same central office or by the central office serving the lobby telephone set since the switched signaling paths are preferably established entirely at the apartment building and are not dependent on any tandem routing of the speech path that may be required to link different central offices. It will in addition be appreciated that it is within the ordinary skill of the art to design door open logic circuit 74 to recognize any unique predetermined digit or combination of digits, not just the digit four, dialed from an apartment telephone to implement lock release. It will also be recognized that the design of door lock mechanism 23 is not restricted to a relay-controlled microswitch but may be any actuatable mechanical, electronic or electromechanical lock mechanism with the point of actuation being controlled in our circuitry by the output of AND gate 609 in lock mechanism control circuit 66. It is further noted that the various time delays employed in master timing circuit 80 during various call states to reset our circuitry for reuse and to activate disconnect circuit 90 are illustrative in nature and may suitably be replaced with any other convenient set of time delays.

Finally, it will be noted that our invention is not restricted in its application to entry authorization of a visitor in a lobby of an apartment building but may be employed in any door answering arrangement wherein a visitor or serviceman at a lobby, vestibule, check point or other lock controlled access point seeks entry to the interior of a building or premises by requesting authorization from persons who are for example, tenants, residents, executives or security personnel. Moreover, the access point need not even be a physical door but may be any lock controlled device such as a safe, vault, computer terminal or other controlled access facility for which a user requires a communicated authorization, usually from any one of a number of persons. Further and other modifications of the embodiments will be apparent to those of ordinary skill in the art.

What is claimed is:

1. A lobby-apartment communication and lobby door lock control system comprising:

means for establishing a voice communication path from a lobby telephone over a communication line and a telephone central office to an apartment telephone;

lock control means, and means responsive to a receipt of coded signals by said establishing means for providing a switched signaling path independent of said central office and between said apartment telephone and said control means; and said control means comprising means responsive to a receipt of authorization signals from said apartment telephone via said switched signaling path for generating a control signal to effect an opening of a lobby door lock.

2. A system in accordance with claim 1 further comprising:

means connectable to said switched signaling path for supplying over said last-mentioned path an alerting signal to said apartment telephone.

3. A system in accordance with claim 1 wherein said authorizing signals include coded multifrequency signals, and said control means includes a multifrequency receiver responsive to a receipt of said coded multifrequency signals over said switched signaling path from said apartment telephone for controlling a generation of said control signal to effect said opening of said lobby door lock.

4. A system in accordance with claim 1 wherein said authorizing signals include coded dial pulse signals, and said control means includes a detector responsive to a receipt of said coded dial pulse signals over said switched signaling path from said apartment telephone for controlling a generation of said control signal to effect said opening of said lobby door lock.

5. A system in accordance with claim 1 wherein said establishing means comprises a circuit having a first termination connectable to said lobby telephone, a second termination connectable to said communication line, and a third termination connected to said means providing said switched signaling path independent of said central office.

6. A system in accordance with claim 5 wherein said means providing said switched signaling path comprises
   a crosspoint switching network for furnishing said switched signaling path between said third termination and said apartment telephone.

7. A system in accordance with claim 1 wherein a multifrequency receiver is shared by said providing means and said lock control means for detecting multifrequency coded signals and multifrequency authorization signals.

8. A system in accordance with claim 1 wherein
   said establishing means is responsive to a receipt of prefix digits and directory digits identifying said apartment telephone for establishing said voice communication path, and said means providing a switched signalling path comprises
   a state counter for counting each of said prefix digits to enable said voice communication path to said central office following a completion of the counting of said prefix digits and for enabling a transmission of said directory digits to said central office.

9. A system in accordance with claim 8 further comprising
   means for supplying an alerting signal through said switched signaling path to said apartment telephone and wherein said state counter is operable in response to a receipt of a prescribed number of said digits for extending the supplied alerting signal from said supplying means to said switched signaling path.

10. A system in accordance with claim 9 wherein said control means further comprises
    line state detector means connectable through said switched signaling path to said apartment telephone and responsive to idle-busy states of said apartment telephone for cooperating with said state counter to extend said supplied alerting signal from said supplying means to said apartment telephone via said switched signaling path prior to a completion of the receipt of said directory digits by said establishing means when said apartment telephone is busy and following a completion of the receipt of said directory digits by said establishing means when said apartment telephone is idle.

11. A system in accordance with claim 10 wherein said alerting signal supplying means includes:
    a tone generator, and
    tone generator control means for enabling said tone generator to supply said tone in response to control signals from said line state detector means; and said line state detector means comprises
    delay means for timing the duration of supervisory states of said apartment telephone to ensure that said control signals from said line state detector means are supplied to said tone control means in response to a detected supervisory state of prescribed duration.

12. A system in accordance with claim 11 wherein said delay means comprises:
    an on-hook off-hook delay circuit for sensing said idle-busy states of said apartment telephone; and
    a ring delay circuit for recognizing incoming call ringing to said apartment telephone over said switched signaling path from said central office.

13. A system in accordance with claim 12 wherein said control signal generating means comprises
    logic means activated by said line state detector means in response to a receipt thereby of dial pulse authorization signals from said apartment telephone via said switching signaling path for furnishing said control signal to effect an opening of said lobby door lock, and said control means includes
    a multifrequency receiver responsive to a receipt of multifrequency authorization signals from said apartment telephone via said switched signaling path for activating said logic means to generate said control signal for effecting an opening of said lobby door lock.

14. A system in accordance with claim 13 wherein said logic means includes
    means for checking the validity of said authorization signals prior to generating said control signal to effect an opening of said lobby door.

15. A system in accordance with claim 14 wherein said logic means further comprises
    means for controlling said establishing means for temporarily disconnecting said lobby telephone from said voice communication path during the checking of said authorization signals by said checking means for precluding said lobby telephone from transmitting undesired authorization signals via said central office to said switched signaling path.

16. A system in accordance with claim 15 wherein said authorization signals comprise a prescribed digit number and said checking means includes:
    means connected to said line state detector means for counting the dial pulse authorization signals to determine a receipt of said prescribed digit number, and including
    means responsive to a receipt of one dial pulse of said authorization signals for actuating said means for controlling said establishing means for temporarily disconnecting said lobby phone from said voice communication path.

17. A system in accordance with claim 16 wherein said checking means further includes:
    means responsive to an initial receipt of said multifrequency authorization signals comprising said prescribed digit number for actuating said means for controlling said establishing means for temporarily disconnecting said lobby telephone from said voice path connection, and
    means responsive during the disconnection of said lobby telephone from said voice path connection to a continued receipt of said multifrequency authorization signals comprising said prescribed digit number for delaying the generation of said control signal to effect an opening of said lobby door lock to verify that the receipt of said multifrequency authorization signals is from said apartment telephone.

18. A system in accordance with claim 8 further comprising:
    means activated by said establishing means for timing the duration that a lobby telephone is connected over said communication line and said central office to said apartment telephone; and
    means for automatically disconnecting said lobby telephone from said voice communication path to terminate lobby-apartment communication.

19. A system in accordance with claim 18 wherein said establishing means includes:

a trunk circuit for interconnecting said lobby telephone and said communication line, and said disconnecting means is effective to control said trunk circuit to disconnect said lobby telephone from said communication line when said lobby telephone is connected to said communication line for longer than said prescribed duration.

20. A system in accordance with claim 19 wherein said trunk circuit comprises:

means including a unidirectional amplifier for connecting a dial tone from said telephone central office to said communication line to said lobby telephone prior to a transmission of said coded signals from said lobby telephone; and switch means controlled by said state counter following a receipt of said prefix digits for establishing a bidirectional transmission from said lobby telephone to said communication line.

21. A system in accordance with claim 20 wherein said switch means is controlled by said logic means to temporarily disconnect said lobby telephone from said bidirectional path during a receipt of said authorization signals.

22. A system for controlling communication and signaling between a plurality of lobbies and a plurality of apartments comprising:

means activatable for establishing a voice communication path from any one of said lobbies over a communication line and a central office to any one of said apartments;

a preference circuit connectable to each of said lobbies for providing an ordered preference to enable service request signals from said lobbies to effect an activation of said establishing means;

logic means;

means responsive to a receipt of coded signals from said estblishing means for providing a switched communication path independent of said central office and between said one of said apartments and said logic means; and said logic means comprising means responsive to a receipt of authorization signals from said one of said apartments via said switched signaling path for generating a control signal to effect an opening of a door lock for a preferred requesting one of said lobbies.

23. A circuit for controlling a lock mechanism comprising:

circuit means having a first termination connectable to a first communication station and a second termination connectable through a telephone switching office to establish a call connection between said first station and a selected one of a plurality of other communication stations;

logic means connectable to said lock mechanism and actuatable in response to a prescribed release signal from said selected one of said other stations for generating a signal to effect an actuation of said mechanism; and switching network means connected to said circuit means and operated in response to path selection signals sent thereto from said first station for establishing a switched signaling path independent of said switching office and via which said prescribed release signal is transmitted between said selected one of said other stations and said logic means.

24. A circuit in accordance with claim 23 further comprising service circuitry coupled between said signaling path and said logic means for detecting said prescribed release signal generated from said selected one of said other stations to actuate said logic means.

25. A circuit in accordance with claim 24 wherein said prescribed release signal is a prescribed digit and wherein said service circuitry comprises a first service circuit for monitoring voltage levels on said signaling path to said selected one of said other stations to determine the call state thereof and responsive to a sensing of a plurality of alternating voltage level dial pulses dialed from said selected one of said other stations to actuate said logic means when the number of said plurality of dial pulses is equal to said prescribed digit.

26. A circuit in accordance with claim 25 further comprising means coupled to said first service circuit and to said switched signaling path for generating a tone thereover to said selected one of said other stations in response to a sensing of particular call states of said other stations by said first service circuit to provide an alerting signal to said selected one of said other stations to indicate a call origination from said first station.

27. A circuit in accordance with claim 26 wherein said service circuitry further comprises a second service circuit coupled between said switched signaling path and said logic means for receiving multifrequency tones dialed over said switched signaling path from said selected one of said other stations to actuate said logic means when a received multifrequency tone represents said prescribed digit.

28. A circuit in accordance with claim 27 wherein said path selection signals are multifrequency tone digits, and said second service circuit is further coupled between said circuit means and said switching network means for detecting said path selection signals sent to said circuit means to operate said switching network means to establish said switched signaling path.

29. A circuit in accordance with claim 28 wherein said call connection is established under control of said circuit means in response to multifrequency tone digits sent thereto from said first station, said circuit further comprising:

means coupled to said second service circuit for counting said path selection digits and said last-mentioned tone digits detected thereat and the interdigital periods therebetween; and means operative during counting of said switched signaling path selection digits by said last-mentioned means and for disabling a transmission path across said circuit means between said first termination and said second termination thereof to prevent said path selection signals from being sent to said telephone switching office and being responsive to a completion of counting of said selection digits by said counting means for restoring said transmission path.

30. A circuit in accordance with claim 29 further comprising means coupled to said tone generating means and responsive to said first service circuit sensing an off-hook voltage level at said selected one of said other stations and to a counting of said tone digits at said counting means for controlling said tone applying means to effect a periodic application of tone bursts to said selected one of said other stations over said switched signaling path.

31. A circuit in accordance with claim 30 wherein said logic means further comprises:
means coupled to said service circuitry for recognizing said prescribed digit; and
means coupled to said lock mechanism for delaying for a predetermined interval the generation of said signal effecting said actuation of said lock mechanism after recognition of said designated digit by said last-mentioned means to prevent receipt of a higher-valued digit at said service circuitry from effecting an actuation of said lock mechanism.

32. A circuit in accordance with claim 31 further comprising:
means included in said recognizing means and coupled to said first service circuit for counting said dial pulses sensed thereat; and
means operated during said counting by said last-mentioned means and during said predetermined interval for temporarily disabling said transmission path in said trunk circuit means between said first termination and said second termination thereof to prevent generation of a simulated release signal from said first station.

33. An arrangement for controlling a door lock mechanism in the lobby of an apartment building wherein said building includes a lobby telephone and a plurality of apartment telephones having lines connectable to a telephone central office, comprising:
circuit means connectable between said lobby telephone and the central office for controlling the establishment of a voice path connection switched via said office to a selected one of said apartment telephones;
receiving means coupled to said circuit means for detecting coded signals generated from any one of said telephones;
switching means connectable to said apartment telephones for selectively establishing a switched signaling path separate and independent of said office between said receiving means and said one of said apartment telephones in response to a detection by said receiving means of coded signals generated from said lobby telephone; and
logic means responsive to a receipt in said receiving means of a predetermined digit generated from said selected one of said apartment telephones over said switched path for generating a control signal to effect a release of said door lock mechanism.

34. The arrangement in accordance with claim 33 further comprising:
digit counting means connected to said receiving means for indicating a completion of generation of said coded signals from said lobby telephone;
means coupled to said switched signaling path and responsive to voltage changes generated on said path by said selected one of said apartment telephones for detecting the state thereof; and
means coupled to said switched signaling path and controlled by said digit counting means and said state detecting means for generating audible bursts of tone on said path for said selected one of said apartment telephones to alert a user thereof of a call attempt from said lobby telephone.

35. The arrangement in accordance with claim 33 wherein said logic means further comprises:
means responsive to a detection of said predetermined digit by said receiving means for establishing a delay interval; and
means coupled to said circuit means and operated only during said delay interval for disabling said voice path connection to impede simulation of said predetermined digit at said lobby telephone.

36. An arrangement for sending a lock mechanism release signal comprising:
a lock controlled access location equipped with a lock mechanism and a telephone set for requesting release of said lock mechanism;
a plurality of authorizing telephone sets; and
a telephone central office for establishing a switched voice path connection between said requesting set and one of said authorizing sets in response to a sending of telephone directory digits of said one of said authorizing sets from said requesting set;
service circuit means for detecting signaling states of said authorizing sets;
switching network means responsive to a sending from said requesting telephone set of a predetermined set of prefix digits assigned to said one of said authorizing sets for selectively establishing a switched signaling path separate and independent of said central office and over which a predetermined lock release signal generated from said one of said authorizing sets is sent to said service circuit means; and
logic circuit means coupled to said service circuit means and to said lock mechanism for recognizing said predetermined lock release signal detected by said service circuit means to effect an opening of said lock mechanism.

37. The arrangement of claim 36 further comprising:
means coupled to said switched signaling path and responsive to a detection by said service circuit means of particular ones of said signaling states and of supervisory states of said one of said authorizing sets for transmitting a signal thereto via said signaling path connection to alert a user of said one of said authorizing sets that said requesting set is attempting to complete a call.

38. The arrangement in accordance with claim 37 further comprising:
repertoire dialer means included in said requesting telephone set and having prerecorded in memory prefix digits and directory digits assigned to each of said authorizing sets for automatically outpulsing said prefix digits and said directory digits of said one of said authorizing sets in response to a depressing of a one of a plurality of pushbuttons corresponding to said one of said authorizing sets, and
trunk circuit means connected in a transmission path between said requesting set and said central office for controlling the establishment of said voice path connection and effective during the outpulsing of said prefix digits from said requesting set to disable said transmission path to prevent said prefix digits from reaching said telephone central office; and
said service means comprising
a digit receiver connected to said trunk circuit means and to said switching network means for detecting said prefix digits and said directory digits received at said trunk circuit means and responsive to a detection of said prefix digits to transmit signaling path selection signals to said switching network means to thereby effect an establishment of said switched signaling path; and means connected to said digit receiver for counting said prefix digits and said directory digits detected at said digit receiver and responsive to a completion of counting of said prefix digits to signal said trunk circuit means to restore said transmission path to enable said directory digits to be outpulsed to said central office.

39. The arrangement in accordance with claim 38 wherein said lock release signal is a digit comprised of a prescribed number of dial pulses generated from said authorizing set and said logic circuit means comprises:

means connected to said service circuit means for counting dial pulses detected thereat to identify said lock release signal digit when said prescribed number has been reached; and means responsive to said service circuit means reaching said prescribed number of dial pulses for establishing a delay interval to effect said opening of said lock mechanism upon expiration of said interval.

40. The arrangement in accordance with claim 39 wherein said logic circuit means further comprises means operated in response to said dial pulse counting means achieving a count of two and maintained operated during said delay interval for signaling said trunk circuit means to disabled said transmission path to prevent unauthorized lock release by the sending of said lock release signal digit from said requesting set.

* * * * *

UNITED STATES PATENT AND TRADEMARK OFFICE
CERTIFICATE OF CORRECTION

PATENT NO. : 4,113,986
DATED : September 12, 1978
INVENTOR(S) : George F. Clement and Bruno R. Sniegowski It is certified that error appears in the above-identified patent and that said Letters Patent are hereby corrected as shown below:

Column 8, line 46, "off-Hook" should read --off-hook--. Column 9, line 18, "switchboard" should read --switched--. Column 9, line 34, "dock" should read --door--. Column 11, line 8, after "4DCT-2" delete period and insert comma. Column 11, line 15, "disclsed" should read --disclosed--. Column 17, line 17, "F51" should read --5F1--. Column 17, line 55, "pulse" should read --phase--. Column 18, line 14, "dooropening" should read --door-opening--. Column 18, line 47, "Q" should read --$\bar{Q}$--. Column 19, line 29, after "two" insert --ms--. Column 20, line 18, after "appears", "at" should read --as--. Column 21, line 57, "827-8S9" should read --8S7-8S9--. Column 26, line 56, "gueued" should read --queued--. Column 31, line 37, "estblishing" should read --establishing--.

Column 36, line 13, "disabled" should read --disable--.

Signed and Sealed this

Twenty-sixth Day of June 1979

[SEAL]

Attest:

RUTH C. MASON
Attesting Officer

DONALD W. BANNER
Commissioner of Patents and Trademarks